United States Patent
Kim

(10) Patent No.: US 8,729,956 B2
(45) Date of Patent: May 20, 2014

(54) SEMICONDUCTOR DEVICE

(75) Inventor: Jung-hyun Kim, Cheongju-si (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 78 days.

(21) Appl. No.: 13/030,372

(22) Filed: Feb. 18, 2011

(65) Prior Publication Data

US 2011/0204963 A1 Aug. 25, 2011

(30) Foreign Application Priority Data

Feb. 25, 2010 (KR) ........................ 10-2010-0017267

(51) Int. Cl.
*G05F 1/10* (2006.01)

(52) U.S. Cl.
USPC .............................. 327/536; 345/212; 363/60

(58) Field of Classification Search
USPC ....................... 327/536; 363/59–60
See application file for complete search history.

(56) References Cited

U.S. PATENT DOCUMENTS

| | | | | |
|---|---|---|---|---|
| 5,414,614 | A * | 5/1995 | Fette et al. | 363/59 |
| 5,559,557 | A * | 9/1996 | Kato | 375/240.03 |
| 5,563,779 | A * | 10/1996 | Cave et al. | 363/59 |
| 5,999,009 | A * | 12/1999 | Mitsui | 327/543 |
| 5,999,040 | A * | 12/1999 | Do et al. | 327/536 |
| 6,249,445 | B1 * | 6/2001 | Sugasawa | 363/60 |
| 6,504,349 | B2 * | 1/2003 | Jaworski | 323/280 |
| 6,700,434 | B2 * | 3/2004 | Fujii et al. | 327/534 |
| 6,787,751 | B2 * | 9/2004 | Tanimoto | 250/208.1 |
| 6,822,645 | B2 * | 11/2004 | Noritake et al. | 345/211 |
| 6,927,441 | B2 * | 8/2005 | Pappalardo et al. | 257/299 |
| 7,126,595 | B2 | 10/2006 | Yanagi et al. | |
| 7,230,471 | B2 | 6/2007 | Choi et al. | |
| 7,253,676 | B2 * | 8/2007 | Fukuda et al. | 327/536 |
| 7,271,642 | B2 * | 9/2007 | Chen et al. | 327/514 |
| 7,602,386 | B2 * | 10/2009 | Maekawa | 345/204 |
| 7,741,899 | B2 * | 6/2010 | Fujiwara | 327/536 |
| 7,902,910 | B2 * | 3/2011 | Park et al. | 327/536 |
| 7,944,277 | B1 * | 5/2011 | Sinitsky et al. | 327/536 |
| 7,969,232 | B2 * | 6/2011 | Chang et al. | 327/536 |
| 8,143,938 | B2 * | 3/2012 | Kawagoshi | 327/536 |
| 8,232,835 | B2 * | 7/2012 | Kim et al. | 327/536 |
| 8,310,479 | B2 * | 11/2012 | Kawagoshi | 345/213 |

(Continued)

FOREIGN PATENT DOCUMENTS

| | | |
|---|---|---|
| JP | 2003-295830 A | 10/2003 |
| KR | 10-2002-0013748 A | 2/2002 |
| KR | 10-2007-0041234 A | 4/2007 |
| KR | 10-2007-0074286 A | 7/2007 |

OTHER PUBLICATIONS

Notice of Allowance issued on Dec. 15, 2011, in corresponding Korean Patent Application No. 10-2010-0017267.

*Primary Examiner* — Thomas J Hiltunen
(74) *Attorney, Agent, or Firm* — NSIP Law

(57) ABSTRACT

A semiconductor device is provided, including a charge-pumping unit configured to charge-pump power voltage in every period of a pumping clock to generate pumping voltage, a first voltage level detection unit configured to detect a maximum voltage level of the generated pumping voltage, a second voltage level detection unit configured to detect a minimum voltage level of the generated pumping voltage, and a pumping clock generating unit configured to generate the pumping clock, the pumping clock having a frequency that is adjusted in response to an output signal of the first and the second voltage level detection units.

39 Claims, 14 Drawing Sheets

(56) References Cited

U.S. PATENT DOCUMENTS

| | | |
|---|---|---|
| 2002/0036636 A1 | 3/2002 | Yanagi et al. |
| 2002/0060917 A1* | 5/2002 | Tanimoto ............... 363/60 |
| 2002/0075063 A1* | 6/2002 | Hwang ................ 327/536 |
| 2006/0001754 A1* | 1/2006 | Yanagisawa et al. ...... 348/308 |
| 2007/0040825 A1* | 2/2007 | Mamba et al. ............ 345/211 |
| 2008/0100600 A1* | 5/2008 | Hsueh .................. 345/204 |
| 2008/0211979 A1* | 9/2008 | Tonomura ............... 349/33 |
| 2009/0200956 A1* | 8/2009 | Kojima ................. 315/291 |
| 2010/0026679 A1* | 2/2010 | Fujiwara ............... 345/214 |
| 2010/0085347 A1* | 4/2010 | Kawagoshi ............. 345/211 |
| 2010/0265241 A1* | 10/2010 | Tahata ................. 345/212 |

* cited by examiner

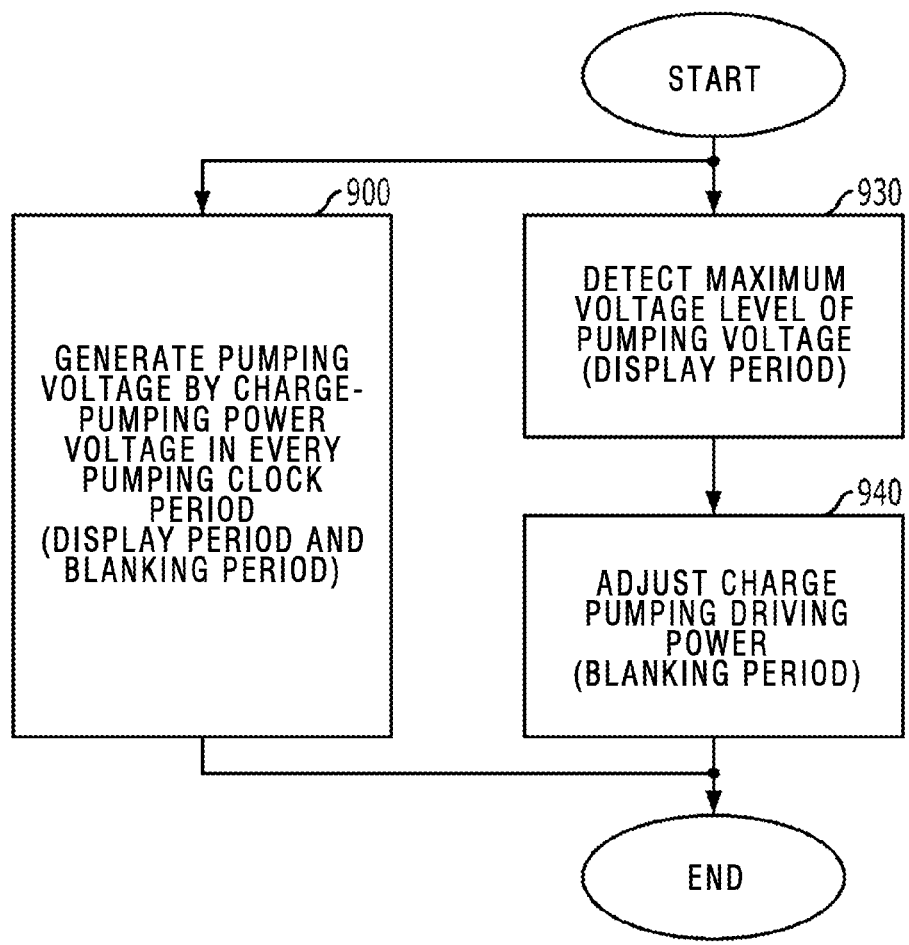

US 8,729,956 B2

SEMICONDUCTOR DEVICE

CROSS-REFERENCE TO RELATED APPLICATIONS

This application claims the benefit under 35 U.S.C. §119(a) of Korean Patent Application No. 10-2010-0017267 filed on Feb. 25, 2010, in the Korean Intellectual Property Office, the entire disclosure of which is incorporated herein by reference for all purposes.

BACKGROUND

1. Field

The following description relates to a semiconductor design technology, and more particularly, to the charge pump circuit of a semiconductor device.

2. Description of Related Art

In order to drive a liquid crystal, a display driver integrated circuit (DDI), such as a Liquid Crystal Display/Active-matrix Organic Light-emitting Diode (LCD/AMOLED) Driver integrated circuit (IC), for a general mobile apparatus includes a circuit generating source line driving voltage, a circuit generating common electrode driving voltage, a circuit generating gamma driving reference voltage, and a circuit generating liquid crystal on/off voltage.

In addition, a DDI includes a charge pump circuit for providing the circuits with power voltage. The charge pump circuit receives external battery power voltage of approximately 2.5 volts to 3.3 volts, boosts the received voltage to generate boost voltage in a range of 4.5 volts to 6 volts, and provides the circuits with the boost voltage as power voltage (AVDD).

FIG. 1A is a block diagram illustrating an example of an operation mechanism of a related charge pump circuit.

Referring to FIG. 1A, a general charge pump circuit includes a charge pump operation control unit 10 that generates control signals (SW1, SW3, SW2, SW4) for controlling the operation of a charge pump 30 using a reference clock, a level shifter 20 that adjusts a voltage level of the control signals (SW1, SW3, SW2, SW4) generated by the charge pump operation control unit 10 to be consistent with a level of the power voltage (AVDD) provided to the transistors formed on the charge pump 30, and the charge pump 30 that performs a charge-pumping operation in response to the control signals (SW1, SW3, SW2, SW4) output from the level shifter 20.

For reference, the charge pump operation control unit 10 and the level shifter 20 may be categorized together as a pumping control unit 40.

FIG. 1B is a circuit diagram illustrating an example of the related charge pump 30 in detail.

Referring to FIG. 1B, the charge pump 30 performs the operation of charge-pumping power voltage (AVDD) two times (AVDD*2 (VGH)).

Specifically, the charge pump 30 includes a first switch (M11) having an end that is connected to power voltage (AVDD) to control on/off in response to the first control signal (SW1), a first capacitor (C11: pumping cap) having one end that is connected to an other end of the first switch (M11), a second switch (M13) having one end that is connected to power voltage (AVDD) and an other end that is connected to the other end of the first capacitor (C11: pumping cap) to control on/off in response to the second control signal (SW3), a third switch (M12) having one end that is connected to the one end of the first capacitor (C11: pumping cap) and an other end that is connected to pumping voltage (AVDD*2 (VGH)) to control on/off in response to the third control signal (SW2), a second capacitor (C12: storaging cap) having one end that is connected to pumping voltage (AVDD*2 (VGH)) and an other end that is connected to ground voltage (VSS), and a fourth switch (M14) having one end that is connected to the other end of the first capacitor (C11: pumping cap) and an other end that is connected to ground voltage (VSS) to control on/off in response to the fourth control signal (SW4).

FIG. 1C is a timing diagram illustrating examples of control signals for controlling the operation of the related charge pump illustrated in FIG. 1B.

Referring to FIG. 1C, reference frequencies of the first to the fourth control signals (SW1, SW3, SW2, SW4, respectively) are the same. A pre-charge period is performed as the second and the third control signals (SW3, SW2, respectively) are inactivated while the first and the fourth control signals (SW1, SW4) are activated. A pumping period is performed as the second and the third control signals (SW3, SW2, respectively) are activated while the first and the fourth control signals (SW1, SW4) are inactivated.

In addition, levels of the control signals change at predetermined time intervals so that the first and the fourth control signals (SW1, SW4) and the second and the third signals (SW3, SW2, respectively) do not overlap with each other.

Furthermore, a pumping operation is performed as the pre-charge period and the pumping period are performed alternately.

For example, the first to the third switches (M11, M13, and M12, respectively) are PMOS transistors and, thus, the first to the third control signals (SW1, SW3, SW2, respectively) are inactivated during the period of logic 'high' and activated during the period of logic 'low'. On the contrary, the fourth switch (M14) is an NMOS transistor and, thus, the fourth control signal (SW4) is activated during the period of logic 'high' and inactivated during the period of logic 'low'.

FIG. 1D is a detailed circuit diagram illustrating an example of an operation of the related charge pump illustrated in FIG. 1B according to the timing of the control signals illustrated in FIG. 1C.

Referring to FIG. 1D, in a pre-charge period, the first and the fourth control signals (SW1, SW4) are activated and, thus, the first and the fourth switches (M11, M14) are closed. The second and the third control signals (SW3, SW2, respectively) are inactivated and, thus, the second and the third switches (M13, M12, respectively) are opened. As a result, electric charge corresponding to power voltage (AVDD) is pre-charged to the first capacitor (C11: pumping cap).

In addition, in a pumping period, the first and the fourth control signals (SW1, SW4) are inactivated and, thus, the first and the fourth switches (M11, M14) are opened. Further, the second and the third controls signals (SW3, SW2, respectively) are activated and, thus, the second and the third switches (M13, M12, respectively) are closed. As a result, electric charge pre-charged to the first capacitor (C11: pumping cap) is discharged and moves to the second capacitor (C12: storaging cap).

Accordingly, electric charge corresponding to power voltage (AVDD) charged in the second capacitor (C12: storaging cap) and voltage corresponding to power voltage (AVDD) of a C11M node are combined in the pumping voltage (AVDD*2 (VGH)). Thus, the pumping voltage (AVDD*2 (VGH)) has a voltage level (2*AVDD) two times as much as the power voltage (AVDD).

Meanwhile, in a related pumping circuit, a frequency of a reference clock and a pumping driving power is fixed to a specific value. Thus, electric current is wasted when a pumping operation is performed regardless of an operation period of a semiconductor device.

That is, the frequency of a reference clock and the pumping driving power of the above-described example of a pumping circuit are designed to generate enough pumping voltage to prevent a shortage of voltage when a semiconductor device consumes a considerable amount of pumping voltage in a relatively short period of time as the semiconductor device enters into an operation period with significant amount of external load.

Accordingly, a charge-pumping circuit according to the above-described example is bound to consume an excessive amount of electric current unnecessarily when a semiconductor device enters into an operation period with small amount of external load and, thus, does not require a considerable amount of pumping voltage in a relatively short period of time.

Therefore, in the case of pumping voltage generated through a charge-pumping circuit according to the above-referenced example, a voltage level changes significantly, which, as a result, causes an operation of a semiconductor device to be unstable.

SUMMARY

According to one general aspect, a semiconductor device is provided, including a charge-pumping unit configured to charge-pump power voltage in every period of a pumping clock to generate pumping voltage, a first voltage level detection unit configured to detect a maximum voltage level of the generated pumping voltage, a second voltage level detection unit configured to detect a minimum voltage level of the generated pumping voltage, and a pumping clock generating unit configured to generate the pumping clock, the pumping clock having a frequency that is adjusted in response to an output signal of the first and the second voltage level detection units.

The semiconductor device of the one general aspect may further provide a driving control unit configured to control charge-pumping driving power of the charge-pumping unit in response to the output signal of the first voltage level detection unit.

The semiconductor device of the one general aspect may further provide that the first voltage level detection unit includes a first detection control pulse generating unit configured to toggle a first detection control pulse sequentially, the first detection control pulse having a predetermined number that is set in an expected first detection section at every predetermined number of period of the pumping clock, a maximum reference voltage generating unit configured to generate a maximum reference voltage, the maximum reference voltage having a level that is adjusted according to a predetermined unit in response to a maximum reference level control code, and a maximum voltage level comparing unit configured to compare a voltage level of the generated pumping voltage with the level of the maximum reference voltage sequentially in response to the toggling of the predetermined number of the first detection control pulse, respectively, and determine each bit value of the maximum reference level control code sequentially in response to a result of the comparing of the voltage level of the generated pumping voltage with the level of the maximum reference voltage.

The semiconductor device of the one general aspect may further provide that the second voltage level detection unit includes a second detection control pulse generating unit configured to toggle a second detection control pulse sequentially, the second detection control pulse having a predetermined number that is set in an expected second detection section at every predetermined number of period of the pumping clock, a minimum reference voltage generating unit configured to generate a minimum reference voltage, the minimum reference voltage having a level that is adjusted according to a predetermined unit in response to a minimum reference level control code, and a minimum voltage level comparing unit configured to compare the voltage level of the generated pumping voltage with the level of the minimum reference voltage sequentially in response to the toggling of the predetermined number of the second detection control pulse, respectively, and determine each bit value of the minimum reference level control code sequentially in response to a result of the comparing of the voltage level of the generated pumping voltage with the level of the minimum reference voltage.

The semiconductor device of the one general aspect may further provide that the charge-pumping unit includes a pumping control unit configured to respectively generate a plurality of first control signals and a plurality of fourth control signals in which a number of activated signals is determined in response to a driving control code in a pre-charge period of the pumping clock, and a plurality of second control signals and a plurality of third control signals in which a number of activated signals is determined in response to a driving control code in a pumping period of the pumping clock, and a charge pump configured to perform a charge-pumping operation in response to the plurality of first to fourth control signals.

The semiconductor device of the one general aspect may further provide that the charge pump includes a plurality of first switches having one end connected to power voltage in parallel and on/off controlled in response to the plurality of first control signals, respectively, a first capacitor having one end commonly connected to an other end of the plurality of first switches, a plurality of second switches having one end connected to the power voltage in parallel, an other end connected to an other end of the first capacitor in parallel, and on/off controlled in response to the plurality of second control signals, a plurality of third switches having one end connected to the one end of the first capacitor in parallel, an other end connected to pumping voltage in parallel, and on/off controlled in response to the plurality of third control signals, a second capacitor having one end connected to the pumping voltage and an other end connected to ground voltage, and a plurality of fourth switches having one end connected to the other end of the first capacitor in parallel, an other end connected to ground voltage in parallel, and on/off controlled in response to the plurality of fourth control signals.

The semiconductor device of the one general aspect may further provide that the driving control unit is further configured to perform a set operation of a value of the maximum reference level control code to determine a value of the driving control code.

The semiconductor device of the one general aspect may further provide that the driving control unit is further configured to select one of a plurality of driving control codes, the selected driving control code being configured to correspond to the maximum reference level control code, the plurality of driving control codes having values that are preset in accordance with a variable value of the maximum reference level control code.

The semiconductor device of the one general aspect may further provide that the pumping clock generating unit includes a code operation unit configured to perform an operation set between a value of the maximum reference level control code and a value of the minimum reference level control code to generate a frequency control code, and a pumping clock output unit configured to receive a pumping reference clock having a predetermined reference frequency to output the pumping clock of which frequency is changed based on a ratio corresponding to the frequency control code.

The semiconductor device of the one general aspect may further provide that the pumping clock generating unit includes a frequency control code table configured to select one of plurality of frequency control codes, the selected frequency control code being configured to correspond to the maximum and minimum reference level control codes, the plurality of frequency control codes having values that are preset in accordance with a variable value of the maximum and minimum reference level control codes, and a pumping clock output unit configured to receive a pumping reference clock having a predetermined reference frequency to output the pumping clock of which frequency is changed according to a ratio corresponding to the selected frequency control code.

In an other general aspect, a semiconductor device is provided, including a charge-pumping unit configured to charge-pump power voltage to generate pumping voltage, a voltage level detection unit configured to detect a maximum voltage level of the generated pumping voltage, and a driving control unit configured to control charge-pumping driving power of the charge-pumping unit in response to an output signal of the voltage level detection unit.

The semiconductor device of the other general aspect may further provide that the voltage level detection unit includes a detection control pulse generating unit configured to toggle a detection control pulse sequentially, the detection control pulse having a predetermined number that is set in an expected detection section at every predetermined number of period of a pumping clock, a maximum reference voltage generating unit configured to generate maximum reference voltage having a level is adjusted in response to a maximum reference level control code, and a maximum voltage level comparing unit configured to compare a voltage level of the pumping voltage with the level of the maximum reference voltage sequentially in response to the toggling of the predetermined number of the detection control pulse, respectively, and determine each bit value of the maximum reference level control code sequentially in response to a result of the comparing of the voltage level of the pumping voltage with the level of the maximum reference voltage.

The semiconductor device of the other general aspect may further provide that the charge-pumping unit includes a pumping control unit configured to respectively generate a plurality of first control signals and a plurality of fourth control signals in which a number of activated signals is determined in response to a driving control code in a pre-charge period of the pumping clock, and a plurality of second control signals and a plurality of third control signals in which a number of activated signals is determined in response to the driving control code in a pumping period of the pumping clock, and a charge pump configured to perform a charge-pumping operation in response to the plurality of first to fourth control signals.

The semiconductor device of the other general aspect may further provide that the charge pump includes a plurality of first switches having one end connected to power voltage in parallel and on/off controlled in response to the plurality of first control signals, respectively, a first capacitor having one end commonly connected to an other end of the plurality of first switches, a plurality of second switches having one end connected to the power voltage in parallel, an other end connected to an other end of the first capacitor in parallel, and on/off controlled in response to the plurality of second control signals, a plurality of third switches having one end connected to the one end of the first capacitor in parallel, an other end connected to pumping voltage in parallel, and on/off controlled in response to the plurality of third control signals, a second capacitor having one end connected to the pumping voltage and an other end connected to ground voltage, and a plurality of fourth switches having one end connected to the other end of the first capacitor in parallel, an other end connected to ground voltage in parallel, and on/off controlled in response to the plurality of fourth control signals.

The semiconductor device of the other general aspect may further provide that the driving control unit is further configured to perform a set operation of a value of the maximum reference level control code to determine a value of the driving control code.

The semiconductor device of the other general aspect may further provide that the driving control unit is further configured to select one of a plurality of driving control codes, the selected driving control code being configured to correspond to the maximum reference level control code, the plurality of driving control codes having values that are preset in accordance with a variable value of the maximum reference level control code.

According to one general aspect, a method for operating a semiconductor device in which pumping voltage is generated by performing charge-pumping with pumping driving power corresponding to a driving control code in every period of a pumping clock where a first display period, a first blanking period, a second display period, and a second blanking period are repeated sequentially is provided, the method including detecting a difference of a maximum voltage level and a minimum voltage level of the pumping voltage in the first display period, and a maximum voltage level of the pumping voltage in the second display period, adjusting a frequency of the pumping clock in the first blanking period in response to the difference between a maximum voltage level and a minimum voltage level of pumping voltage which is detected through the first detection, and determining a value of the driving control code in the second blanking period in response to a result of the detecting of the maximum voltage level.

The method of the one general aspect may further provide that the adjusting of the frequency includes, if the difference in the voltage level between the maximum voltage level and the minimum voltage level of the pumping voltage determined through the detecting of the difference is less than a predetermined reference level difference, applying the frequency of the pumping clock slowly according to a predetermined unit in the first blanking period, if the difference in the voltage level between the maximum voltage level and the minimum voltage level of the pumping voltage determined through the detecting of the difference is greater than the predetermined reference level difference, applying the frequency of the pumping clock fast according to the predetermined unit in the first blanking period, and, if the difference in the voltage level between the maximum voltage level and the minimum voltage level of the pumping voltage determined through the detecting of the difference is consistent with the predetermined reference level difference within a predetermined scope, maintaining the frequency of the pumping clock.

The method of the one general aspect may further provide that the detection of the difference includes determining a value of a maximum reference level control code corresponding to the maximum voltage level of the pumping voltage in an operation section of the first display period, and a value of a minimum reference level control code corresponding to the minimum voltage level of the pumping voltage in the operation section of the first display period, and generating a frequency control code in response to the maximum reference level control code and the minimum reference level control code in the operation section of the first display period.

The method of the one general aspect may further provide that the determining of the values of the maximum and minimum reference level control codes includes determining an each bit value of the maximum reference level control code sequentially by comparing a voltage level of the pumping voltage in every expected section of the detecting of the difference of each period with a level of a maximum reference voltage, the level of the maximum reference voltage being adjusted according to a predetermined unit based on the value of the maximum reference level control code, a period of the pumping clock being repeated for a predetermined number of times in the operation section of the first display period, and an each bit value of the minimum reference level control code sequentially by comparing a voltage level of pumping voltage in every expected section of the detecting of the maximum voltage level of each period with a level of a minimum reference voltage, the level of the minimum reference voltage being adjusted according to a predetermined unit based on the value of the minimum reference level control code, a period of the pumping clock being repeated for a predetermined number of times in the operation section of the first display period, and maintaining the values of the maximum and minimum reference level control codes that are determined in the operation section of the first display period in an operation section of the first blanking period.

The method of the one general aspect may further provide that the generating of the frequency control code includes performing an operation set between the value of the maximum reference level control code and the value of the minimum reference level control code to generate the frequency control code, and selecting the frequency control code corresponding to the maximum and minimum reference level control codes from among a plurality of frequency control codes of which values are preset in accordance with a variable value of the maximum and minimum reference level control codes.

The method of the one general aspect may further provide that the adjusting of the frequency includes receiving a pumping reference clock having a reference frequency set in an operation section of the first blanking period, adjusting a frequency of the pumping clock based on a ratio corresponding to the frequency control code, and maintaining the adjusted frequency of the pumping clock in the first blanking period regardless of a change in the frequency control code in the operation section of the first display period.

The method of the one general aspect may further provide that the determining of the value of the driving control code includes, if the detected maximum voltage level of the pumping voltage is less than a predetermined reference level by greater than a predetermined scope, increasing the value of the driving control code, if the detected maximum voltage level of the pumping voltage is greater than the predetermined reference level by greater than the predetermined scope, decreasing the value of the driving control code, and, if the detected maximum voltage level of the pumping voltage is consistent with the predetermined reference level within the predetermined scope, maintaining the value of the driving control code.

The method of the one general aspect may further provide, if the value of the driving control code increases in an operation section of the second blanking period, generating the pumping voltage by charge-pumping power voltage with increased charge-pumping driving power, if the value of the driving control code decreases in the operation section of the second blanking period, generating the pumping voltage by charge-pumping power voltage with decreased charge-pumping driving power, if the value of the driving control code is maintained in the operation section of the second blanking period, generating the pumping voltage by charge-pumping power voltage with previous charge-pumping driving power, and, if the value of the driving control code is changed in an operation section of the first and the second display periods, generating the pumping voltage by charge-pumping power voltage with previous charge-pumping driving power.

The method of the one general aspect may further provide that, in a power on period that is performed before an operation section of the first and the second display periods and the first and the second blanking periods, the value of the driving control code is always fixed to a maximum value regardless of the determining of the value, and the pumping voltage is generated by charge-pumping power voltage with maximum charge-pumping driving power accordingly.

The method of the one general aspect may further provide that the detecting of the maximum voltage level includes determining an each bit value of a maximum reference level control code sequentially by comparing a voltage level of the pumping voltage in every expected section of the detections of the difference and the maximum voltage level of each period with a level of a maximum reference voltage, the level of the maximum reference voltage being adjusted according to a predetermined unit based on a value of a maximum reference level control code, a period of the pumping clock being repeated for a predetermined number of times in an operation section of the second display period, and maintaining the value of the maximum reference level control code in an operation section of the second blanking period, the value of the maximum reference level control code being determined in the operation section of the second display period.

The method of the one general aspect may further provide that the determining of the value of the driving control code includes generating the driving control code by performing a set operation of the value of the maximum reference level control code, and selecting the driving control code corresponding to the maximum reference level control code from among a plurality of driving control codes having values that are preset in accordance with a variable value of the maximum reference level control code.

In an other general aspect, a method for operating a semiconductor device in which pumping voltage is generated by charge-pumping power voltage with pumping driving power corresponding to a driving control code in repeated display periods and blanking periods is provided, the method including detecting a maximum voltage level of the pumping voltage in the display periods, and determining a value of the driving control code in the blanking periods in response to the detected maximum voltage level.

The method of the other general aspect may further provide that the determining of the value includes, if the detected maximum voltage level of the pumping voltage is less than a predetermined reference level by greater than a predetermined scope, increasing the value of the driving control code, if the detected maximum voltage level of the pumping voltage is greater than the predetermined reference level by greater than the predetermined scope, decreasing the value of the driving control code, and, if the detected maximum voltage level of the pumping voltage is consistent with the predetermined reference level within the predetermined scope, maintaining the value of the driving control code.

The method of the other general aspect may further provide, if the value of the driving control code increases in an operation section of the blanking periods, generating the pumping voltage by charge-pumping power voltage with increased charge-pumping driving power, if the value of the driving control code decreases in the operation section of the blanking periods, generating the pumping voltage by charge-pumping power voltage with decreased charge-pumping driving power, if the value of the driving control code is maintained in the operation section of the blanking period, generating the pumping voltage by charge-pumping power voltage with previous charge-pumping driving power, and, if the value of the driving control code is changed in an operation section of the display periods, generating the pumping voltage by charge-pumping power voltage with previous charge-pumping driving power.

The method of the other general aspect may further provide that, in a power on period that is entered as power is supplied and is performed before the display and blanking periods, the value of the driving control code is always fixed to a maximum value regardless of the determining of the value, and the pumping voltage is generated by charge-pumping power voltage with maximum charge-pumping driving power accordingly.

The method of the other general aspect may further provide that the detecting of the maximum voltage level includes determining an each bit value of a maximum reference level control code sequentially by comparing a voltage level of the pumping voltage in every expected section of the detecting of the maximum voltage level of each period with a level of a maximum reference voltage, the level of the maximum reference voltage being is adjusted according to a predetermined unit based on the value of a maximum reference level control code, a period of the pumping clock being repeated for a predetermined number of times in an operation section of the display periods, and maintaining the value of the maximum reference level control code in an operation section of the blanking periods.

The method of the other general aspect may further provide that the determining of the value includes generating the driving control code by performing a set operation of the value of the maximum reference level control code, and selecting the driving control code corresponding to the maximum reference level control code from among a plurality of driving control codes having values that are preset in accordance with a variable value of the maximum reference level control code.

According to yet another general aspect, a method for operating a semiconductor device in which pumping voltage is generated by charge-pumping power voltage with pumping driving power corresponding to a driving control code in repeated display periods and blanking periods is provided, the method including detecting a maximum voltage level and a minimum voltage level of the pumping voltage in the display periods, adjusting a frequency of the pumping clock in the blanking periods in response to a difference between the detected maximum voltage level and the detected minimum voltage level of the pumping voltage, and determining a value of the driving control code in the blanking periods in response to the detected maximum voltage level of the pumping voltage.

The method of the yet another general aspect may further provide that the adjusting of the frequency includes, if a difference in a voltage level between the detected maximum voltage level and the detected minimum voltage level of the pumping voltage is less than a predetermined reference level difference, applying the frequency of the pumping clock slowly as much as a predetermined unit in the blanking periods, if a difference in a voltage level between the detected maximum voltage level and the detected minimum voltage level of the pumping voltage is greater than the predetermined reference level difference, applying the frequency of the pumping clock fast as much as the predetermined unit in the blanking periods, and, if a difference in a voltage level between the detected maximum voltage level and the detected minimum voltage level of the pumping voltage is consistent with the predetermined reference level difference within in a predetermined scope, maintaining the frequency of the pumping clock in the blanking periods.

The method of the yet another general aspect may further provide that the determining of the value includes, if the detected maximum voltage level of the pumping voltage is less than a predetermined reference level by greater than a predetermined scope, increasing the value of the driving control code, if the detected maximum voltage level of the pumping voltage is greater than the predetermined reference level by greater than the predetermined scope, decreasing the value of the driving control code, and, if the detected maximum voltage level of the pumping voltage is consistent with the predetermined reference level within the predetermined scope, maintaining the value of the driving control code.

The method of the yet another general aspect may further provide that the detecting includes determining, in an operation section of the display periods, a value of a maximum reference level control code corresponding to the maximum voltage level of the pumping voltage, and a value of a minimum reference level control code corresponding to the minimum voltage level of the pumping voltage.

The method of the yet another general aspect may further provide that the adjusting of the frequency includes generating a frequency control code by performing an operation set between the value of the maximum reference level control code and the value of the minimum reference level control code, selecting the frequency control code corresponding to the maximum and minimum reference level control codes from among a plurality of frequency control codes having values that are preset in accordance with a variable value of the maximum and minimum reference level control codes, receiving a pumping reference clock having a reference frequency set in an operation section of the blanking periods, adjusting a frequency of the pumping clock based on a ratio corresponding to the frequency control code, and maintaining the adjusted frequency of the pumping clock in the blanking periods regardless of a change in the frequency control code in an operation section of the display periods.

The method of the yet another general aspect may further provide that the determining of the value of the driving control code includes generating the driving control code by performing a set operation of the determined value of the maximum reference level control code, and selecting the driving control code corresponding to the maximum reference level control code from among a plurality of driving control codes that are preset in accordance with a variable value of the maximum reference level control code.

Other features and aspects may be apparent from the following detailed description, the drawings, and the claims.

BRIEF DESCRIPTION OF THE DRAWINGS

FIG. 9 is a flowchart illustrating an example of an operation mechanism of the charge pump circuit illustrated in FIG. 8.

Figure 1A:
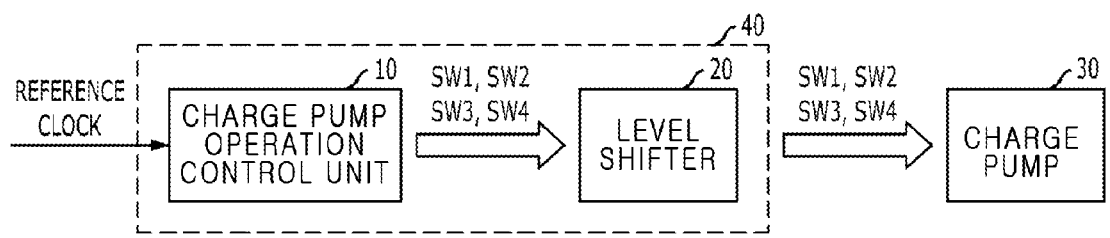
FIG. 1A is a block diagram illustrating an example of an operation mechanism of a related charge pump.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. In addition, descriptions of well-known functions and constructions may be omitted for increased clarity and conciseness.

It is understood that the features and aspects described herein may be embodied in different forms and should not be constructed as limited to the examples set forth herein. Rather, the general aspects described herein are provided so that this detailed description will be thorough and complete, and will convey the full scope of the general aspects to those skilled in the art. The drawings may not necessarily be to scale, and, in some instances, proportions may have been exaggerated in order to clearly illustrate features of the general aspects described herein.

Figure 2A:
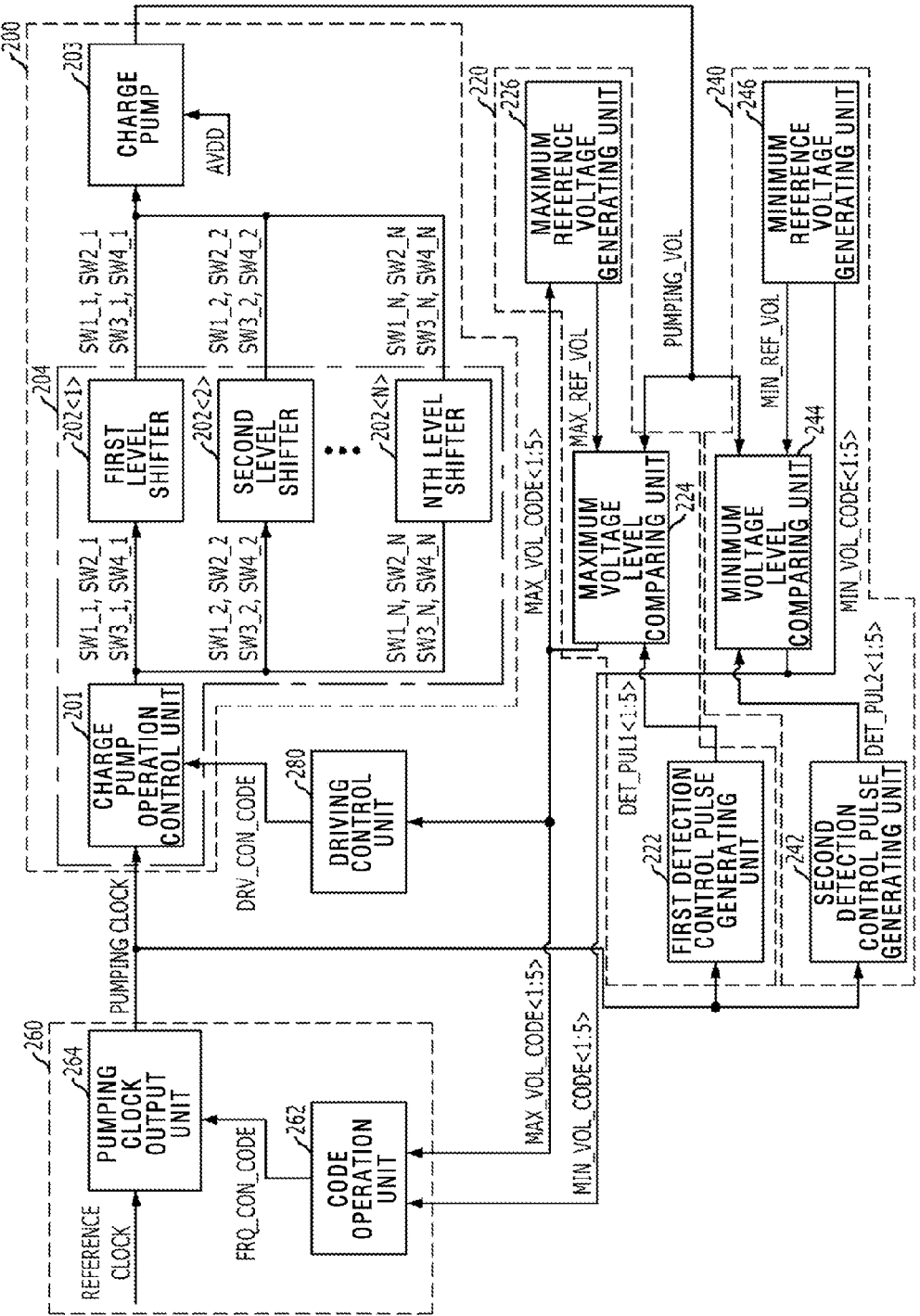
FIG. 2A is a block diagram illustrating an example of a charge pump circuit.

FIG. 2A is a block diagram illustrating an example of a charge pump circuit.

Referring to FIG. 2A, a charge pump circuit may include a charge-pumping unit 200 configured to charge-pump power voltage (AVDD) at each period of a pumping clock to generate pumping voltage (PUMPING_VOL), a first voltage level detection unit 220 configured to detect a maximum voltage level of the generated pumping voltage (PUMPING_VOL), a second voltage level detection unit 240 configured to detect a minimum voltage level of the generated pumping voltage (PUMPING_VOL), a pumping clock generating unit 260 configured to generate the pumping clock, the pumping clock having a frequency that is adjusted in response to an output signal (MAX_VOL_CODE<1:5>) of the first voltage level detection unit 220 and an output signal (MIN_VOL_CODE<1:5>) of the second voltage level detection unit 240, and a driving control unit 280 configured to adjust charge-pumping driving power of the charge-pumping unit 200 in response to the output signal (MAX_VOL_CODE<1:5>) of the first voltage level detection unit 220.

The first voltage level detection unit 220 described herein may include a first detection control pulse generating unit 222 configured to toggle a first detection control pulse (DET_PUL1<1:5>) sequentially, the first detection control pulse having a predetermined number that is set in an expected first detection section at every predetermined number of period of the pumping clock, a maximum reference voltage generating unit 226 configured to generate a maximum reference voltage (MAX_REF_VOL), the maximum reference voltage having a level that is adjusted according to a predetermined unit in response to a maximum reference level control code (MAX_VOL_CODE<1:5>), and a maximum voltage level comparing unit 224 configured to compare a voltage level of pumping voltage (PUMPING_VOL) with the level of the maximum reference voltage (MAX_REF_VOL) sequentially in response to the toggling of the predetermined number of the first detection control pulse (DET_PUL1<1:5>), respectively, and determine each bit value of the maximum reference level control code (MAX_VOL_CODE<1:5>) sequentially in response to a result of the comparing of the voltage level of the pumping voltage (PUMPING_VOL) with the level of the maximum reference voltage (MAX_REF_VOL).

The second voltage level detection unit 240 may include a second detection control pulse generating unit 242 configured to toggle a second detection control pulse (DET_PUL2<1:5>) sequentially, the second detection control pulse having a predetermined number that is set in an expected second detection section at every predetermined number of period of the pumping clock, a minimum reference voltage generating unit 246 configured to generate a minimum reference voltage (MIN_REF_VOL), the minimum reference voltage having a level that is adjusted according to a predetermined unit in response to a minimum reference level control code (MIN_VOL_CODE<1:5>), and a minimum voltage level comparing unit 244 configured to compare the voltage level of the pumping voltage (PUMPING_VOL) with the level of the minimum reference voltage (MIN_REF_VOL) sequentially in response to the toggling of the predetermined number of the second detection control pulse (DET_PUL2<1:5>), respectively, and determine each bit value of the minimum reference level control code (MIN_VOL_CODE<1:5>) sequentially in response to a result of the comparing of the voltage level of the pumping voltage (PUMPING_VOL) with the level of the minimum reference voltage (MIN_REF_VOL).

In addition, the charge-pumping unit 200 may include a pumping control unit 240 configured to respectively generate a plurality of first control signals (SW1<1:N>) and a plurality of fourth control signals (SW4<1:N>) in which a number of activated signals is determined in response to a driving control code (DRV_CON_CODE) in a pre-charge period of the pumping clock, and a plurality of second control signals (SW3<1:N>) and a plurality of third control signals (SW2<1:N>) in which a number of activated signals is determined in response to a driving control code (DRV_CON_CODE) in the pumping period of the pumping clock, and a charge pump 203 configured to perform a charge-pumping operation in response to the generated plurality of first to fourth control signals (SW1<1:N>, SW3<1:N>, SW2<1:N>, SW4<1:N>).

The pumping clock generating unit may have two example configurations.

As illustrated in FIG. 2A, a first example of a pumping clock generating unit 260 may include a code operation unit 262 configured to perform an operation set between a value of the maximum reference level control code (MAX_VOL_CODE<1:5>) and a value of the minimum reference level control code (MIN_VOL_CODE<1:5>) to generate a frequency control code (FRQ_CON_CODE), and a pumping clock output unit 264 configured to receive a pumping reference clock having a predetermined reference frequency to output the pumping clock of which frequency is changed based on a ratio corresponding to the frequency control code (FRQ_CON_CODE).

Figure 2B:
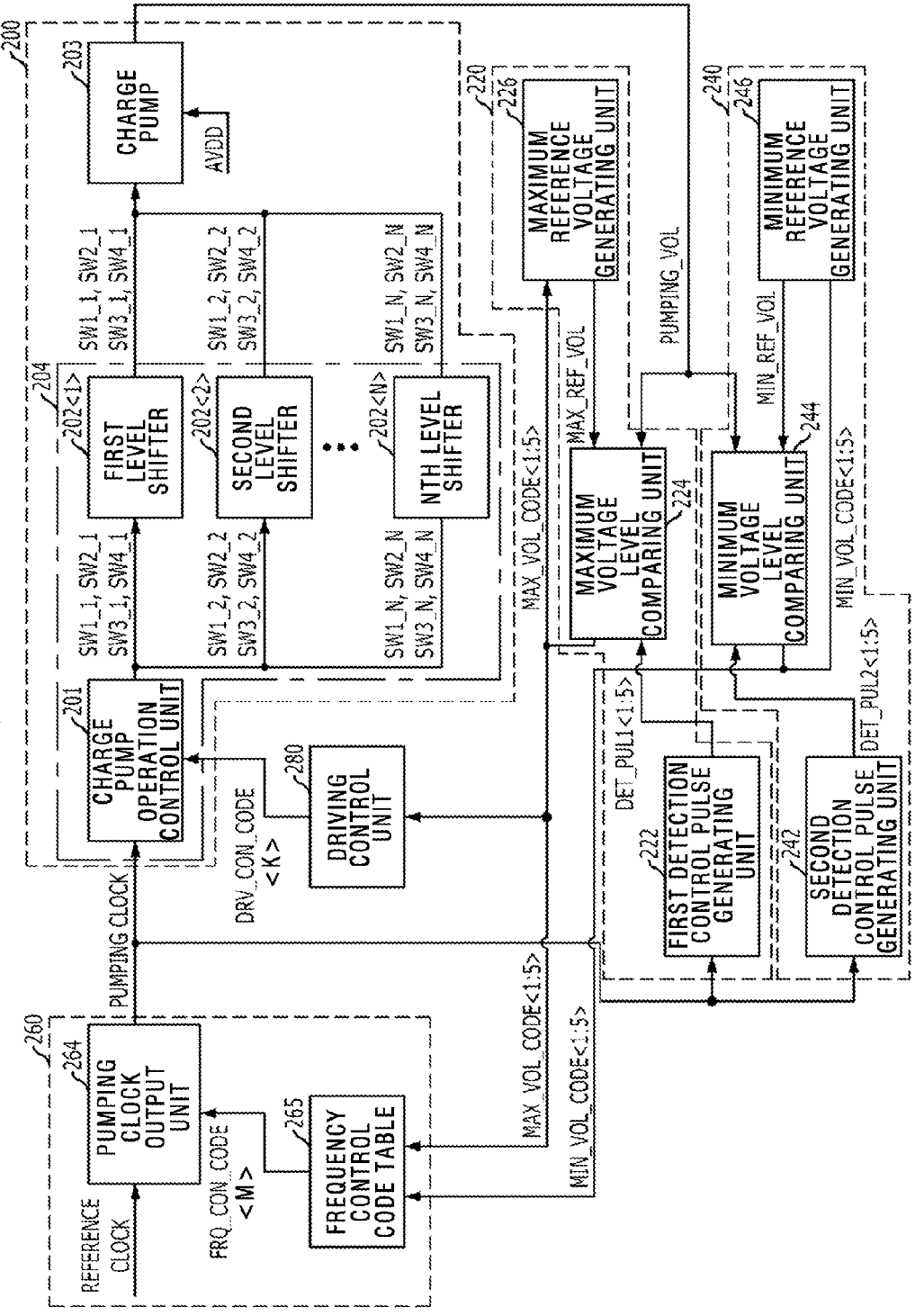
FIG. 2B is a block diagram illustrating another example of a charge pump circuit.

As illustrated in FIG. 2B, a second example of a pumping clock generating unit may include a frequency control code table 265 configured to select one of a plurality of frequency control codes (FRQ_CON_CODE<1> or FRQ_CON_CODE<2> or . . . or FRQ_CON_CODE<M>), the selected frequency control code being configured to correspond to the maximum reference level control code (MAX_VOL_CODE<1:5>) and the minimum reference level control code (MIN_VOL_CODE<1:5>), the plurality of frequency control codes (FRQ_CON_CODE<1:M>) of having values that are present in accordance with a variable value of the maximum reference level control code (MAX_VOL_CODE<1:5>) and the minimum reference level control code (MIN_VOL_CODE<1:5>), and a pumping clock output unit configured to receive a pumping reference clock having a predetermined reference frequency to output the pumping clock of which frequency is changed according to a ratio corresponding to the selected frequency control code.

In addition, a driving control unit may have two example configurations.

As illustrated in FIG. 2A, a first example of a driving control unit 280 may be further configured to perform a set operation of a value of the maximum reference level control code (MAX_VOL_CODE<1:5>) to determine a value of a driving control code (DRV_CON_CODE).

As illustrated in FIG. 2B, a second example of a driving control unit may be configured to select one of a plurality of driving control codes (DRV_CON_CODE<1> or DRV_CON_CODE<2> or . . . or DRV_CON_CODE<K>), the selected driving control code being configured to correspond to the maximum reference level control code (MAX_VOL_CODE<1:5>), the plurality of driving control codes (DRV_CON_CODE<1> or DRV_CON_CODE<2> or . . . or DRV_CON_CODE<K>) having values that are preset in accordance with a variable value of the maximum reference level control code (MAX_VOL_CODE<1:5>).

Figure 3A:
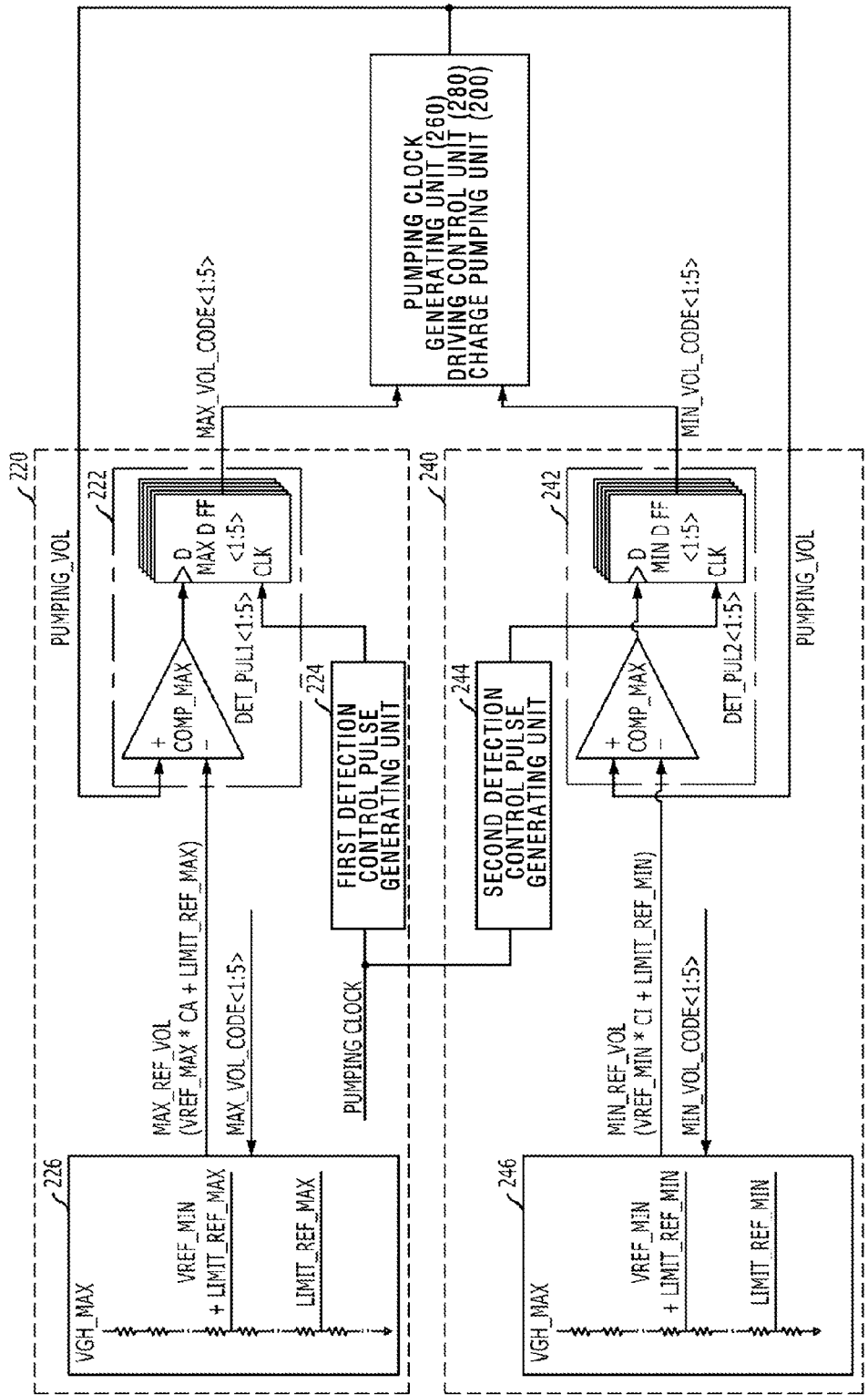
FIG. 3A is a circuit diagram illustrating an example of a configuration of a voltage level detection circuit in detail from among components of the charge pump circuit illustrated in FIG. 2A.

FIG. 3A is a circuit diagram illustrating an example of a configuration of a voltage level detection circuit in detail from among components of the charge pump circuit illustrated in FIG. 2A.

Figure 3B:
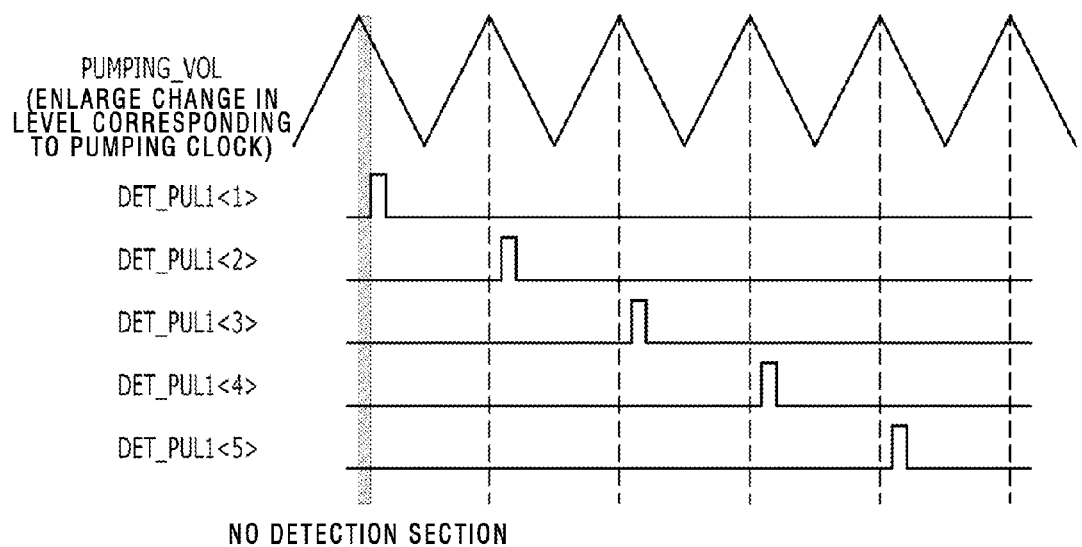
FIG. 3B is a timing diagram illustrating an example of a mechanism of generating a first detection control pulse from the voltage level detection circuit illustrated in FIG. 3A.

FIG. 3B is a timing diagram illustrating an example of a mechanism of generating a first detection control pulse from the voltage level detection circuit illustrated in FIG. 3A.

Figure 3C:
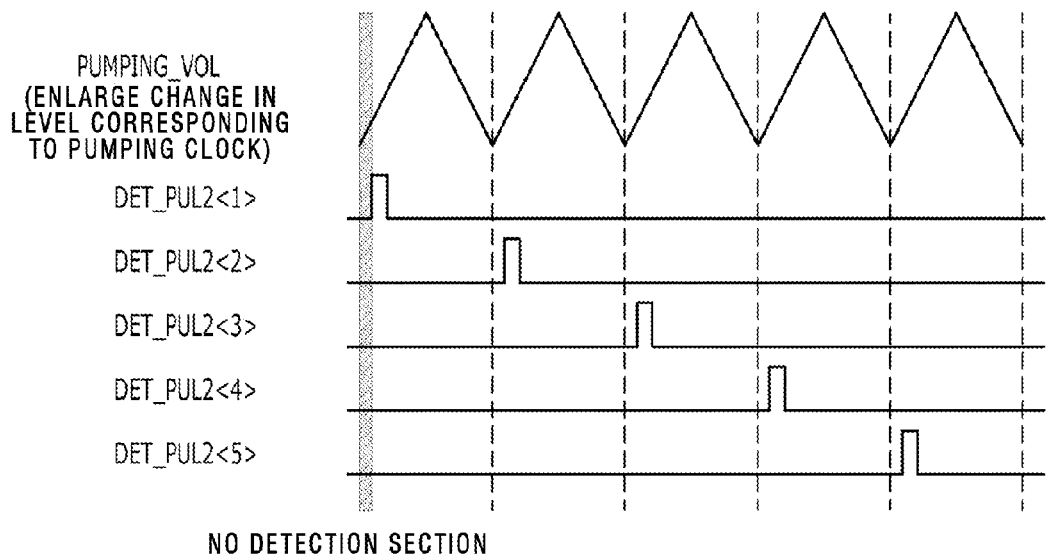
FIG. 3C is a timing diagram illustrating an example of a mechanism of generating a second detection control pulse from the voltage level detection circuit illustrated in FIG. 3A.

FIG. 3C is a timing diagram illustrating an example of a mechanism of generating a second detection control pulse from the voltage level detection circuit illustrated in FIG. 3A.

Referring to FIGS. 3A and 3B, the first detection control pulse generating unit 222 may be configured to generate a plurality of first detection control pulses (DET_PUL1<1:5>) toggling in an expected first detection section corresponding to a level of pumping voltage (PUMPING_VOL) that is changed to have a certain shape according to the period of the pumping clock.

Specifically, as illustrated in FIG. 3B, a voltage level of pumping voltage (PUMPING_VOL) may be configured to increase in a pumping period of the pumping clock so that the pumping voltage (PUMPING_VOL) has a maximum level by a time when the pumping period ends, and a voltage level of pumping voltage (PUMPING_VOL) may be configured to decrease in a pre-charge period of the pumping clock so that the pumping voltage (PUMPING_VOL) has a minimum level by a time when the pre-charge period ends.

Accordingly, if a level of pumping voltage (PUMPING_VOL) is measured right after the pumping period of the pumping clock ends, that is, right after the pre-charge period of the pumping clock starts, the level of the detected pumping voltage (PUMPING_VOL) may be a maximum level of the pumping voltage (PUMPING_VOL).

Therefore, an expected first detection section may be configured to represent a certain section right after the pumping period of the pumping clock ends, that is, right after the pre-charge period of the pumping clock starts.

While the period of the pumping clock is repeated for a predetermined number of times (5 times in FIG. 3B), a plurality of first detection control pulses (DET_PUL1<1:5>) toggling sequentially in a first detection section at every period may be generated to determine a value of each bit since the maximum reference level control code (MAX_VOL_CODE<1:5>) generated by the first voltage level detection unit 220 is consisted of a predetermined bit (5 bits in FIG. 3B).

That is, as a plurality of first detection control pulses (DET_PUL1<1:5>) performs toggling sequentially in every first detection section of the period of the pumping clock, an each bit value of the maximum reference level control code (MAX_VOL_CODE<1:5>) may be determined sequentially.

For reference, a "no detection section" may exist right before the expected first detection section in FIG. 3B since pumping voltage (PUMPING_VOL) may be toggled to an abnormally high level instantly due to a switching operation of the charge-pumping unit 200 in the "no detection section". The "no detection section" may be a section where the pumping clock is changed from the pumping period to the pre-charge period.

Referring to FIG. 3A, the maximum reference voltage generating unit 226 in the first voltage level detection unit 220 may have a plurality of resistance elements connected between maximum power voltage (VGH_MAX) and ground voltage (VSS) in series. In addition, the maximum reference voltage generating unit 226 may be configured to generate a plurality of maximum reference voltages (VREF_MAX+LIMIT_REF_MAX~LIMIT_REF_MAX) having a level that is distributed from a connection part of some of the plurality of resistance elements, as the connection part of some of the plurality of resistance elements is configured to distribute a level of the maximum power voltage (VGH_MAX) according to a predetermined unit. Further, the maximum reference voltage generating unit 226 may be configured to select a maximum reference voltage (VREF_MAX*CA+LIMIT_REF_MAX) corresponding to a maximum reference level control code (MAX_VOL_CODE<1:5>) from among the plurality of maximum reference voltages (VREF_MAX+

LIMIT_REF_MAX~LIMIT_REF_MAX), and output the selected maximum reference voltage (MAX_REF_VOL).

In general aspects described herein, "CA" may be determined in accordance with the maximum reference level control code (MAX_VOL_CODE<1:5>) as is shown below in Table 1.

TABLE 1

| Max_vol_code <1:5> | CA Initial value | Max_vol <1> CA value after determination | Max_vol <2> CA value after determination | Max_vol <3> CA value after determination | Max_vol CA value after determination | Final CA Value |
|---|---|---|---|---|---|---|
| 00000 | 1 | 1/2 | 1/4 | 1/8 | 1/16 | 1/32 |
| 00001 | 1 | 1/2 | 1/4 | 1/8 | 1/16 | 3/32 |
| 00010 | 1 | 1/2 | 1/4 | 1/8 | 3/16 | 5/32 |
| 00011 | 1 | 1/2 | 1/4 | 1/8 | 3/16 | 7/32 |
| 00100 | 1 | 1/2 | 1/4 | 3/8 | 5/16 | 9/32 |
| 00101 | 1 | 1/2 | 1/4 | 3/8 | 5/16 | 11/32 |
| 00110 | 1 | 1/2 | 1/4 | 3/8 | 7/16 | 13/32 |
| 00111 | 1 | 1/2 | 1/4 | 3/8 | 7/16 | 15/32 |
| 01000 | 1 | 1/2 | 3/4 | 5/8 | 9/16 | 17/32 |
| 11101 | 1 | 3/2 | 7/4 | 15/8 | 29/16 | 59/32 |
| 11110 | 1 | 3/2 | 7/4 | 15/8 | 31/16 | 61/32 |
| 11111 | 1 | 3/2 | 7/4 | 15/8 | 31/16 | 63/32 |

That is, if a value of a first maximum reference level control code (MAX_VOL_CODE<1>) from among the maximum reference level control codes (MAX_VOL_CODE<1:5>) is determined, a first "CA" value may be determined accordingly. Further, if a value of a second maximum reference level control code (MAX_VOL_CODE<2>) from among the maximum reference level control codes (MAX_VOL_CODE<1:5>) is determined, the first "CA" may be changed. As such, the "CA" value may keep changing sequentially until every bit value of the maximum reference level control code (MAX_VOL_CODE<1:5>) and a final "CA" value are determined.

For example, a final "CA" value corresponding to a maximum reference level control code (MAX_VOL_CODE<1:5>) may be "1/32". A maximum reference voltage (MAX_REF_VOL) corresponding to a maximum reference level control code (MAX_VOL_CODE<1:5>) from among a plurality of maximum reference voltages (VREF_MAX+LIMIT_REF_MAX~LIMIT_REF_MAX) may be "{VREF_MAX*(1/32)}+LIMIT_REF_MAX". Further, if a "CA" value corresponding to a maximum reference level control code (MAX_VOL_CODE<1:5>) is "17/32", a maximum reference voltage (MAX_REF_VOL) corresponding to the maximum reference level control code (MAX_VOL_CODE<1:5>) from among a plurality of maximum reference voltages (VREF_MAX+LIMIT_REF_MAX~LIMIT_REF_MAX) may be "{VREF_MAX*(17/32)}+LIMIT_REF_MAX".

The maximum voltage level comparing unit 224 in the first voltage level detection unit 220 may include a maximum level comparator (COMP_MAX) configured to compare pumping voltage (PUMPING_VOL) which is charge-pumped by the charge-pumping unit 200 with a level of maximum reference voltage (MAX_REF_VOL) generated by the maximum reference voltage generating unit 226, and a plurality of flip-flops (MAX D FF) configured to store an output value of the maximum level comparator (COMP_MAX) sequentially in response to each of the first detection control pulses (DET_PUL1<1:5>) to generate a maximum reference level control code (MAX_VOL_CODE<1:5>).

Referring to FIGS. 3A and 3C, the second detection control pulse generating unit 242 may be configured to generate a plurality of second detection control pulses (DET_PUL2<1:5>) toggling in an expected second detection section corresponding to a level of pumping voltage (PUMPING_VOL) which is changed to have a certain shape according to a period of the pumping clock.

Specifically, as illustrated in FIG. 3C, a voltage level of the pumping voltage (PUMPING_VOL) may increase in a pumping period of the pumping clock so that the pumping voltage (PUMPING_VOL) has a maximum level by a time when the pumping period ends. Further, a voltage level of the pumping voltage (PUMPING_VOL) may decrease in a pre-charge period of the pumping clock so that the pumping voltage (PUMPING_VOL) has a minimum level by a time when the pre-charge period ends.

Accordingly, if a level of the pumping voltage (PUMPING_VOL) is measured right after the pre-charge period of the pumping clock ends, that is, right after the pumping period of the pumping clock starts, the level of the detected pumping voltage (PUMPING_VOL) may be a minimum level of the pumping voltage (PUMPING_VOL).

Therefore, an expected second detection section may be configured to represent a certain section right after the pre-charge period of the pumping clock ends, that is, right after the pumping period of the pumping clock starts.

While a period of the pumping clock is repeated for a predetermined number of times (5 times in FIG. 3), a plurality of second detection control pulses (DET_PUL2<1:5>) toggling sequentially in a second detection section at every period may be generated to determine a value of each bit since the minimum reference level control code (MIN_VOL_CODE<1:5>) generated by the second voltage level detection unit 240 may include a predetermined bit (5 bits in FIG. 3).

That is, as a plurality of second detection control pulses (DET_PUL2<1:5>) performs toggling sequentially in every second detection section of the period of the pumping clock, an each bit value of the minimum reference level control code (MIN_VOL_CODE<1:5>) may be determined sequentially.

For reference, a "no detection section" exists right before the expected second detection section in FIG. 3C since pumping voltage (PUMPING_VOL) may be toggled to an abnormally low level instantly due to a switching operation of the charge-pumping unit 200 in the "no detection section". The "no detection section" may be a section where the pumping clock is changed from the pre-charged period to the pumping period.

Referring to FIG. 3A, the minimum reference voltage generating unit 246 in the second voltage level detection unit 240 may have a plurality of resistance elements being connected between maximum power voltage (VGH_MAX) and ground voltage (VSS) in series. In addition, the minimum reference voltage generating unit 246 may be configured to generate a plurality of minimum reference voltages (VREF_MIN+LIMIT_REF_MIN~LIMIT_REF_MIN) having levels distributed from a connection part of some of the plurality of resistance elements as the connection part of some of the plurality of resistance elements distributes a level of the maximum power voltage (VGH_MAX) according to a predetermined unit. Further, the minimum reference voltage generating unit 246 may be configured to select a minimum reference voltage (VREF_MIN*CI+LIMIT_REF_MIN) corresponding to a minimum reference level control code (MIN_VOL_CODE<1:5>) from among a plurality of minimum reference voltages (VREF_MIN+LIMIT_REF_MIN~LIMIT_REF_MIN), and output the selected minimum reference voltage (MIN_REF_VOL).

Herein, the method for determining "CI" in accordance with the minimum reference level control code (MIN_VOL_CODE<1:5>) may be similar to the method for determining "CA" in accordance with the maximum reference level control code (MAX_VOL_CODE<1:5>) which is presented in Table 1.

That is, if a value of a first minimum reference level control code (MIN_VOL_CODE<1>) from among the minimum reference level control codes (MIN_VOL_CODE<1:5>) is determined, a first "CI" value may be determined accordingly. If a value of a second minimum reference level control code (MIN_VOL_CODE<2>) from among the minimum reference level control codes (MIN_VOL_CODE<1:5>) is determined, the first "CI" may be changed. As such, the "CI" value may keep changing sequentially until every bit value of the minimum reference level control codes (MIN_VOL_CODE<1:5>) and a final "CI" value are determined.

For example, if a final "CI" value corresponding to a minimum reference level control code (MIN_VOL_CODE<1:5>) is "3/32", a minimum reference voltage (MIN_REF_VOL) corresponding to a minimum reference level control code (MIN_VOL_CODE<1:5>) from among a plurality of maximum reference voltages (VREF_MIN+LIMIT_REF_MIN~LIMIT_REF_MIN) may be "{VREF_MIN*(3/32)}+LIMIT_REF_MIN". If a "CI" value corresponding to a minimum reference level control code (MIN_VOL_CODE<1:5>) is '15/32', a minimum reference voltage (MIN_REF_VOL) corresponding to a minimum reference level control code (MIN_VOL_CODE<1:5>) from among a plurality of minimum reference voltages (VREF_MIN+LIMIT_REF_MIN~LIMIT_REF_MIN) may be "{VREF_MIN*(15/32)}+LIMIT_REF_MIN".

The minimum voltage level comparing unit 244 in the second voltage level detection unit 240 may include a minimum level comparator (COMP_MIN) configured to compare pumping voltage (PUMPING_VOL) being charge-pumped by the charge-pumping unit 200 with a level of minimum reference voltage (MIN_REF_VOL) generated by the minimum reference voltage generating unit 246, and a plurality of flip-flops (MIN D FF) configured to store storing an output value of the minimum level comparator (COMP_MIN) sequentially in response to each of the second detection control pulses (DET_PUL2<1:5>) to generate a minimum reference level control code (MIN_VOL_CODE<1:5>).

Figure 4:
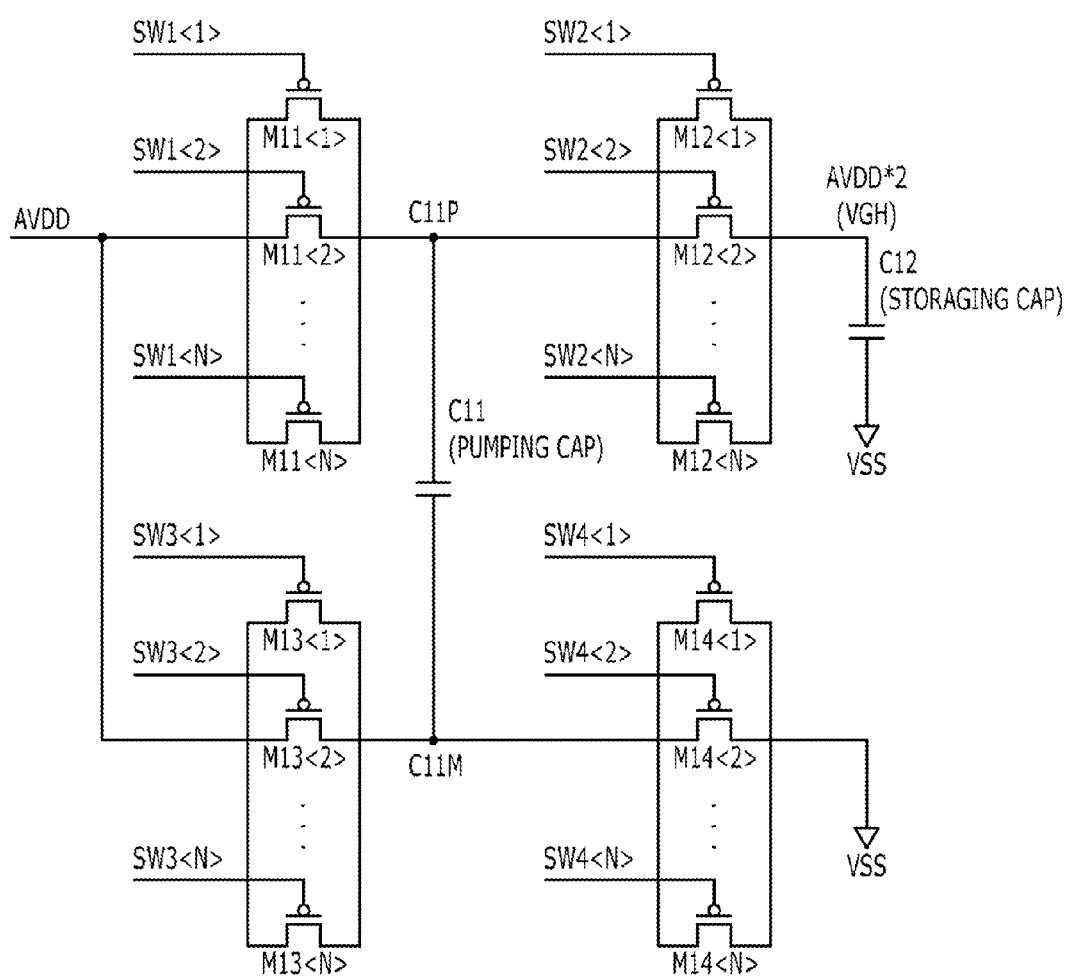
FIG. 4 is a circuit diagram illustrating an example of the charge pump in detail from among components of the charge pump circuit illustrated in FIG. 2A.

FIG. 4 is a circuit diagram illustrating an example of the charge pump 203 in detail from among components of the charge pump circuit illustrated in FIG. 2A.

Referring to FIG. 4, the charge pump may include a plurality of first switches (M11<1:N>) having one end connected to power voltage (AVDD) in parallel, respectively, and on/off controlled in response to the plurality of first control signals (SW1<1:N>), a first capacitor (C11: pumping cap) having one end commonly connected to an other end of the plurality of first switches (M11<1:N>), a plurality of second switches (M13<1:N>) having one end connected to power voltage (AVDD) in parallel, an other end connected to an other end of the first capacitor (C11: pumping cap) in parallel, and on/off controlled in response to the plurality of second control signals (SW3<1:N>), a plurality of third switches (M12<1:N>) having one end connected to the one end of the first capacitor (C11: pumping cap) in parallel, an other end connected to pumping voltage (AVDD*2 (VGH)) in parallel, and on/off controlled in response to the plurality of third control signals (SW2<1:N>), a second capacitor (C12: storaging cap) having one end connected to the pumping voltage (AVDD*2 (VGH)) and an other end connected to ground voltage (VSS), and a plurality of fourth switches (M14<1:N>) having one end connected to the other end of the first capacitor (C11: pumping cap) in parallel, an other end connected to ground voltage (VSS) in parallel, and on/off controlled in response to a plurality of fourth control signals (SW4<1:N>).

Figure 5A:
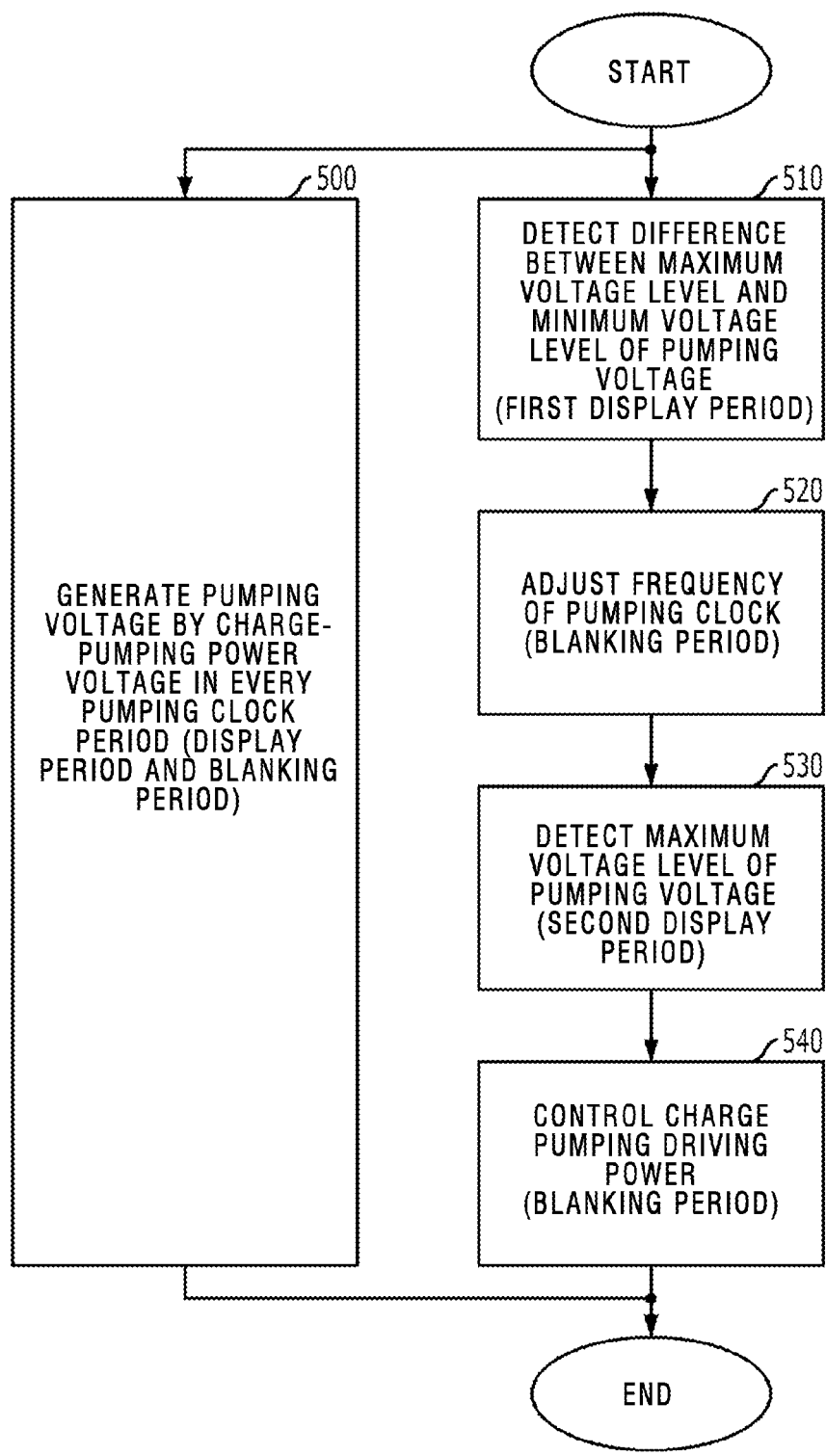
FIG. 5A is a flowchart illustrating an example of an operation mechanism of the charge pump circuit illustrated in FIG. 2A.

FIG. 5A is a flowchart illustrating an example of an operation mechanism of the charge pump circuit illustrated in FIG. 2A.

Figure 5B:
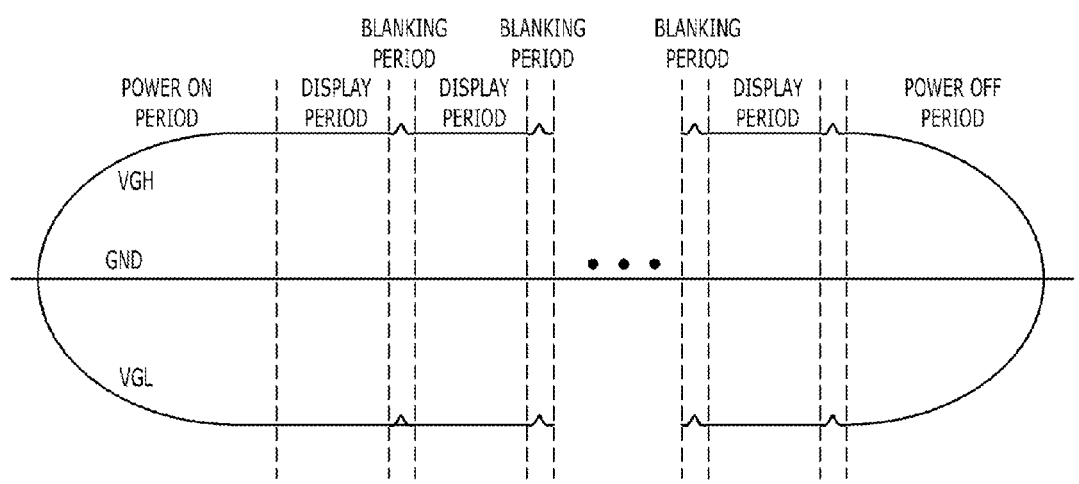
FIG. 5B is a timing diagram illustrating an example of an operation mechanism of the charge pump circuit illustrated in FIG. 2A.

FIG. 5B is a timing diagram illustrating an example of the operation mechanism of the charge pump circuit illustrated in FIG. 2A.

Referring to FIG. 5A, an operation of a charge pump circuit illustrated in FIG. 2A may include generating pumping voltage (AVDD*2 (VGH)) by charge-pumping power voltage (AVDD) at every period of a pumping clock in a first display period, a second display period and a blanking period (500), adjusting charge-pumping driving power in the blanking period in response to a driving control code (DRV_CON_CODE) (540), detecting a difference of a maximum voltage level and a minimum voltage level of pumping voltage (AVDD*2 (VGH)) in the first display period (510), adjusting a frequency of the pumping clock in the blanking period in response to the result of the detecting of the voltage level difference (510), detecting a maximum voltage level of pumping voltage (AVDD*2 (VGH)) in the second display period (530), and determining a value of the driving control code (DRV_CON_CODE) (540) in response to a result of the detecting of the maximum voltage level (530).

In this case, the above-mentioned first display period and second display period may represent an operation section in which a liquid crystal operates in a DDI (Display Driver IC, LCD/AMOLED Driver IC, and so on). Further, the above-mentioned blanking period may represent an operation section in which a liquid crystal does not operate. In an example, a display period may be categorized as the first display period, the second display period and the blanking period. In another example, a display period may be categorized as a display period and a blanking period as illustrated in FIG. 5B. In yet another example, according to FIG. 5B, a display period may be categorized as the first display period and the second display period as below.

Firstly, if the first display period and the second display period corresponds to respective display periods illustrated in FIG. 5B, an enter/exit operation of the first display period may occur before an enter/exit operation of the blanking period, an enter/exit operation of the second display period may occur before the enter/exit operation of the blanking period, and the enter/exit operation of the first display period may occur later than the enter/exit operation of the second display period.

Accordingly, as illustrated in FIG. 5B, after a power on period ends, an operation of generating pumping voltage (AVDD*2 (VGH)) by charge-pumping power voltage (AVDD) at every period of a pumping clock may be performed without regard to any specific type of period (500).

In addition, an odd-numbered display period that enters after a power on period ends may become the first display period and may detect a difference in a voltage level between a maximum voltage level and a minimum voltage level of pumping voltage (AVDD*2 (VGH)). In the blanking period that is entered after the odd-numbered display period, a frequency of the pumping clock may be adjusted in response to a detection difference result in a voltage level between a maximum voltage level and a minimum voltage level of pumping voltage (AVDD*2 (VGH)). In this case, the operation of adjusting the frequency of the pumping clock should be performed in the blanking period since, if the frequency of the pumping clock is changed while a liquid crystal is operated in the DDI (Display Driver IC, LCD/AMOLED Driver IC, and so on), the liquid crystal may not be operated in consistent color.

In addition, an even-numbered display period that enters after a power on period ends may become the second display period and may detect a maximum voltage level of pumping voltage (AVDD*2 (VGH)). In the blanking period that is entered after the even-numbered display period, charge-pumping driving power of the charge-pumping unit 200 may be adjusted (540) as a value of a driving control code (DRV_CON_CODE) is determined in response to the result of the detection of the maximum voltage level of pumping voltage (AVDD*2 (VGH)). In this case, the operation of adjusting charge-pumping driving power of the charge-pumping unit 200 (540) should be performed in the blanking period since, if the charge-pumping driving power is changed while a liquid crystal is operated in the DDI (Display Driver IC, LCD/AMOLED Driver IC, and so on), the liquid crystal may not be operated in consistent color.

In addition, if the first display period and the second display period correspond to a single display period illustrated in FIG. 5B, an enter/exit operation of the first display period may occur before an enter/exit operation of the second display period, the enter/exit operation of the second display period may occur before an enter/exit operation of the blanking period, and the enter/exit operation of the blanking period may occur before the enter/exit operation of the first display period.

Accordingly, in the case where the first display period and the second display period correspond to a single display period illustrated in FIG. 5B, after a power on period ends, an operation of generating pumping voltage (AVDD*2 (VGH)) by charge-pumping power voltage (AVDD) at every period of a pumping clock may be performed without regard to any specific type of period (500).

In addition, a display period which is entered after a power on period ends becomes the first display period and the second display period, and the operation of detecting difference in a voltage level between a maximum voltage level and a minimum voltage level of pumping voltage (AVDD*2 (VGH)) and the operation of detecting a maximum voltage level of pumping voltage (AVDD*2 (VGH)) are performed simultaneously. In a blanking period that is entered after the display period, the operation of adjusting a frequency of the pumping clock in response to the result of detection of difference in a voltage level between a maximum voltage level and a minimum voltage level of pumping voltage (AVDD*2 (VGH)) and the operation of adjusting charge-pumping driving power of the charge-pumping unit 200 by determining a value of a driving control code (DRV_CON_CODE) in response to the result of detection of a maximum voltage level of pumping voltage (AVDD*2 (VGH)) (540) are performed simultaneously. In this case, the operation of adjusting the frequency of the pumping clock and the operation of adjusting charge-pumping driving power of the charge-pumping unit 200 should be performed in the blanking period since, if the frequency of the pumping clock is changed or charge-pumping driving power of the charge-pumping unit 200 is changed while a liquid crystal is operated in a DDI (Display Driver IC:LCD/AMOLED Driver IC and so on), the liquid crystal may not be operated in consistent color.

As described above, if a semiconductor device has a charge pump circuit according to examples described herein, a maximum voltage level and a minimum voltage level of pumping voltage (AVDD*2 (VGH)) may be detected respectively, an operation frequency of a charge-pumping circuit may be changed corresponding to a difference in a voltage level between the detected maximum voltage level and the detected minimum voltage level of pumping voltage (AVDD*2 (VGH)), and pumping driving power of the charge-pumping circuit may be changed according to the changed operation frequency and the detected maximum voltage level of pumping voltage (AVDD*2 (VGH)). Accordingly, an electric charge-pumping operation may be performed stably while consuming a minimum amount of electric current.

Figure 6:
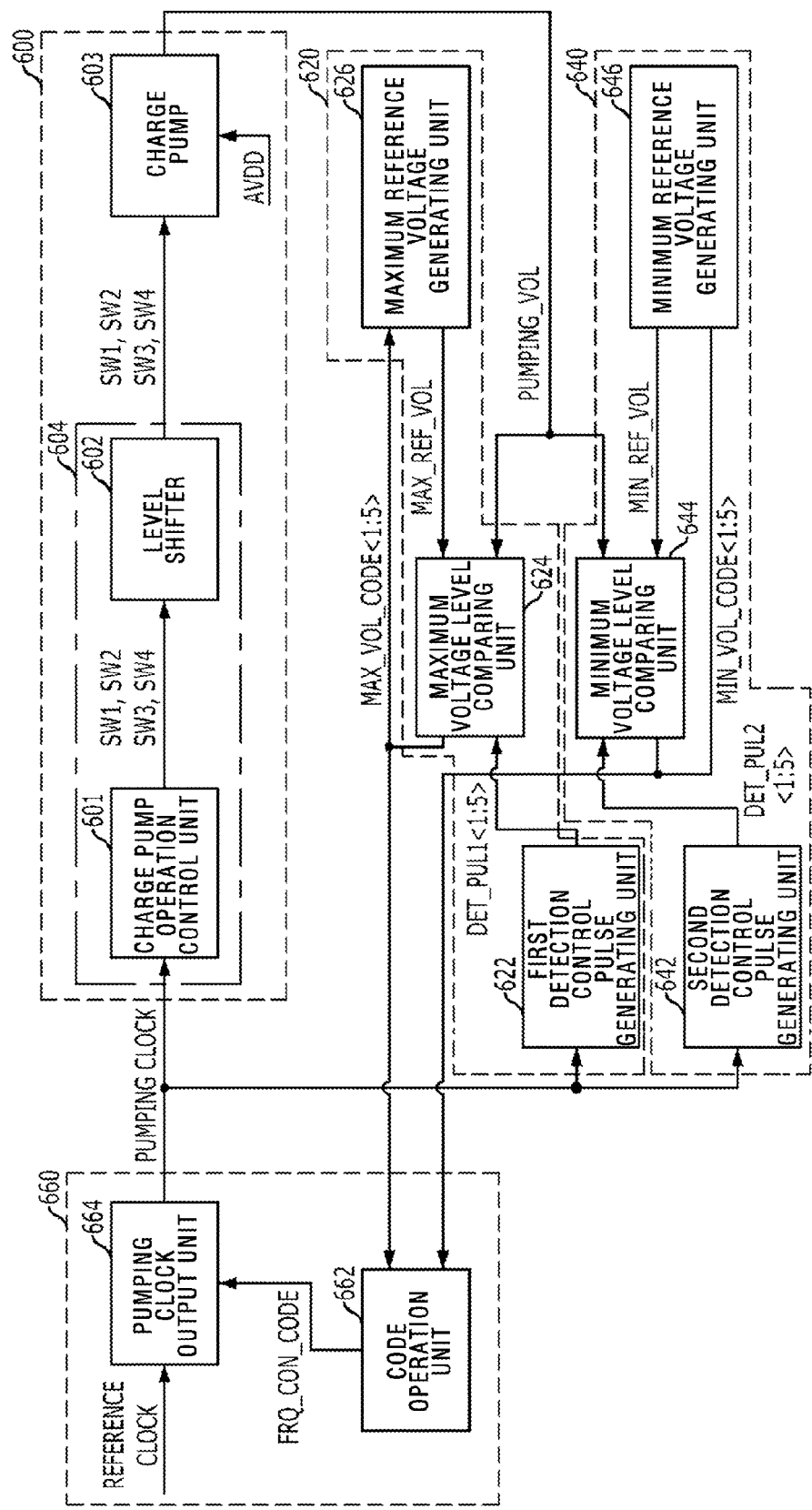
FIG. 6 is a block diagram illustrating another example of a charge pump circuit.

FIG. 6 is a block diagram illustrating another example of a charge pump circuit.

Referring to FIG. 6, another example of a charge pump circuit may include a charge-pumping unit 600 configured to charge-pump power voltage (AVDD) at each period of a pumping clock to generate pumping voltage (PUMPING_VOL), a power level detection unit 620, 640 configured to detect a maximum voltage level and a minimum voltage level of the pumping voltage (PUMPING_VOL), and a pumping clock generating unit 660 configured to generate the pumping clock having a frequency that is adjusted in response to an output signal (MAX_VOL_CODE<1:5>, MIN_VOL_CODE<1:5>) of the voltage level detection unit 620, 640.

Herein, the voltage level detection unit 620, 640 may include a detection control signal generating unit 622, 642 configured to generate a first detection control pulse (DET_PUL1<1:5>) and a second detection control pulse (DET_PUL2<1:5>) in response to the pumping clock, a maximum voltage level detection unit 624, 626 configured to detect a maximum voltage level of the pumping voltage (PUMPING_VOL) in response to the first detection control pulse (DET_PUL1<1:5>), and a minimum voltage level detection unit 644, 646 configured to detect a minimum voltage level of the pumping voltage (PUMPING_VOL) in response to the second detection control pulse (DET_PUL2<1:5>).

In addition, the detection control signal generating unit 622, 642 is configured to toggle a first detection control pulse (DET_PUL1<1:5>) sequentially, the first detection control pulse having a number that is set in an expected first detection section at every predetermined number of period of the pumping clock, and a second detection control pulse (DET_PUL2<1:5>) sequentially, the second detection control pulse having a number of that is set in an expected second detection section at every predetermined number of period of the pumping clock.

In addition, the maximum voltage level detection unit 624, 626 may include a maximum reference voltage generating unit 626 configured to generate maximum reference voltage (MAX_REF_VOL), the maximum reference voltage having a level that is adjusted according to a predetermined unit in response to a maximum reference level control code (MAX_VOL_CODE<1:5>), and a maximum voltage level comparing unit 624 configured to compare a voltage level of the pumping voltage (PUMPING_VOL) with the level of the maximum reference voltage (MAX_REF_VOL) sequentially in response to toggling of the predetermined number of the first detection control pulse (DET_PUL1<1:5>) respectively, and determine each bit value of the maximum reference level control code (MAX_VOL_CODE<1:5>) sequentially in response to the comparison result.

Further, the minimum voltage level detection unit 644, 646 may include a minimum reference voltage generating unit 646 configured to generate minimum reference voltage (MIN_REF_VOL), the minimum reference voltage having a level that is adjusted according to a predetermined unit in response to a minimum reference level control code (MIN_VOL_CODE<1:5>), and a minimum voltage level comparing unit 644 configured to compare a voltage level of the pumping voltage (PUMPING_VOL) with the level of the minimum reference voltage (MIN_REF_VOL) sequentially in response to toggling of the predetermined number of the second detection control pulse (DET_PUL2<1:5>) respectively, and determine each bit value of the minimum reference level control code (MIN_VOL_CODE<1:5>) sequentially in response to the comparison result.

The pumping clock generating unit may have two example configurations.

As illustrated in FIG. 6, a first example of a pumping clock generating unit 660 may include a code operation unit 662 configured to perform an operation set between a value of the maximum reference level control code (MAX_VOL_CODE<1:5>) and a value of the minimum reference level control code (MIN_VOL_CODE<1:5>) to generate a frequency control code (FRQ_CON_CODE) and a pumping clock output unit 664 configured to receive a pumping reference clock having a predetermined reference frequency and output the pumping clock of which frequency is changed based on a ratio corresponding to the frequency control code (FRQ_CON_CODE).

Although not illustrated, a second example of a pumping clock generating unit may include a frequency control code table configured to select a frequency control code (FRQ_CON_CODE<1> or FRQ_CON_CODE<2> or . . . or FRQ_CON_CODE<M>) corresponding to the maximum reference level control code (MAX_VOL_CODE<1:5>) and the minimum reference level control code (MIN_VOL_CODE<1:5>) from among a plurality of frequency control codes (FRQ_CON_CODE<1:M>) of which a value is preset corresponding to a variable value of the maximum reference level control code (MAX_VOL_CODE<1:5>) and the minimum reference level control code (MIN_VOL_CODE<1:5>) and a pumping clock output unit configured to receive a pumping reference clock having a predetermined reference frequency, and output the pumping clock of which frequency is changed based on a ratio corresponding to the frequency control code (FRQ_CON_CODE<1> or FRQ_CON_CODE<2> or . . . or FRQ_CON_CODE<M>) selected by the frequency control code table.

In addition, the charge-pumping unit 600 may include a pumping control unit 604 configured to generate the first and the fourth control signals (SW1, SW4) that are activated in a pre-charge period of the pumping clock and the second and the third control signals (SW3, SW2, respectively) that are activated in a pumping period of the pumping clock, and a charge pump 603 configured to perform a charge-pumping operation in response to the first to the fourth control signals (SW1, SW3, SW2, SW4, respectively).

Herein, the pumping control unit 604 may include a charge pump operation control unit 601 configured to generate the first to the fourth control signals (SW1, SW3, SW2, SW4, respectively) in response to a pumping reference clock, and a level shifter 602 configured to adjust an activation/inactivation level of the first to the fourth control signals (SW1, SW3, SW2, SW4, respectively) to be consistent with a voltage level of power voltage (AVDD) provided to the transistors formed on the charge pump 603.

Figure 1B:
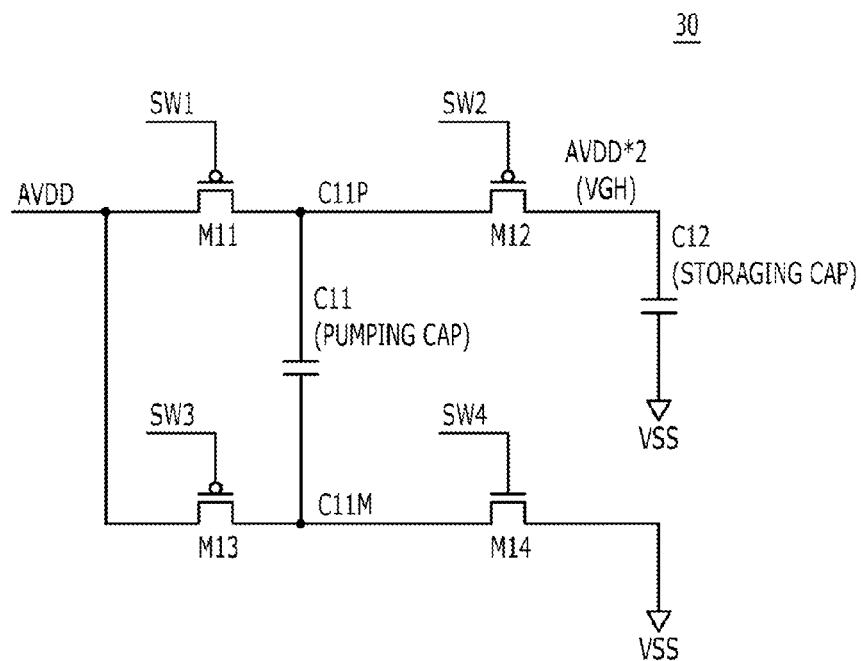
FIG. 1B is a circuit diagram illustrating an example of a related charge pump in detail.
Figure 1C:
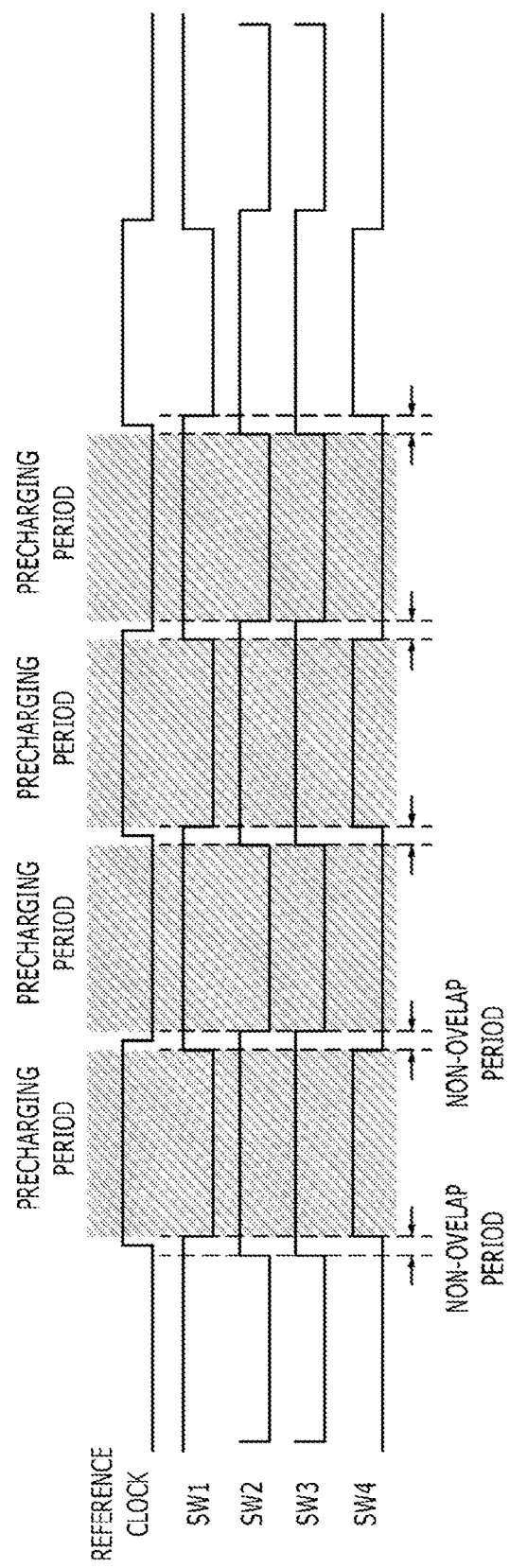
FIG. 1C is a timing diagram illustrating examples of control signals for controlling an operation of the related charge pump illustrated in FIG. 1B.
Figure 1D:
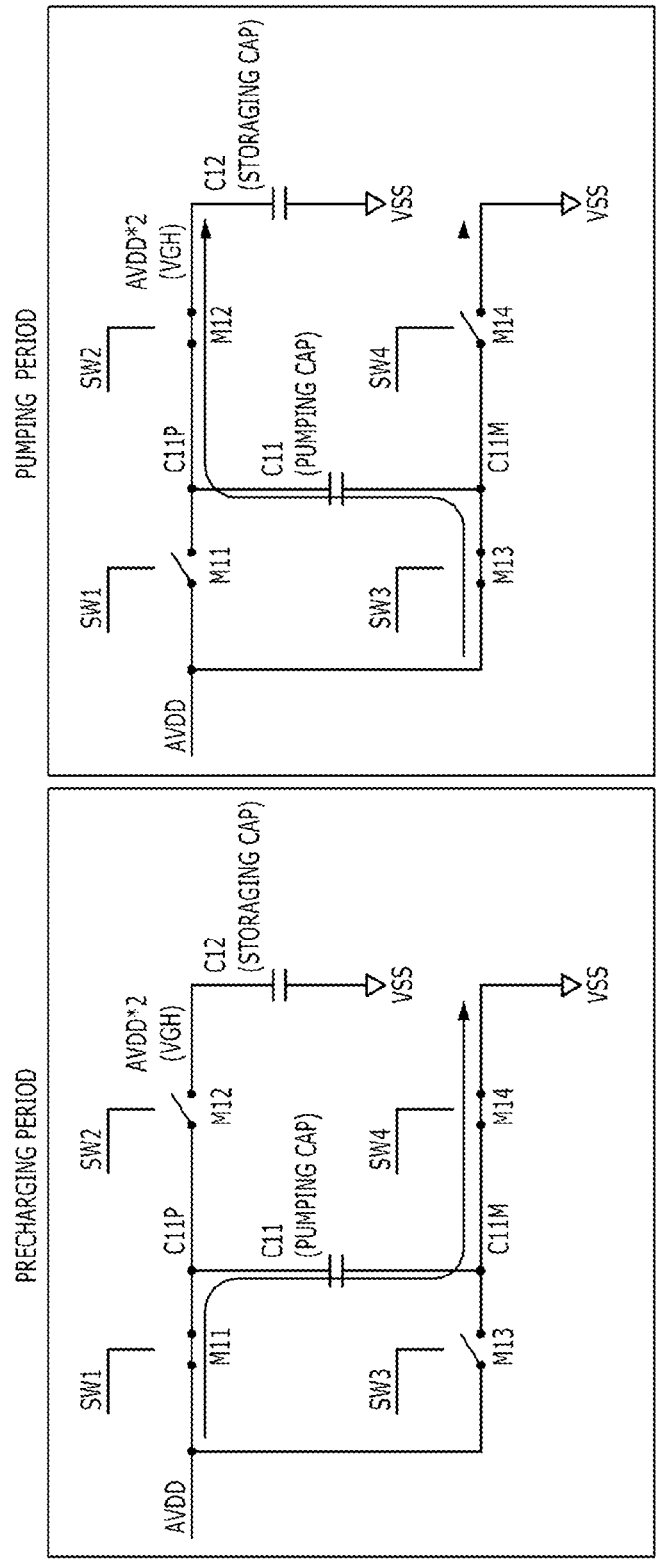
FIG. 1D is a detailed circuit diagram illustrating an example of an operation of the related charge pump illustrated in FIG. 1B according to a timing of the control signals illustrated in FIG. 1C.

Herein, the charge pump 603 may have the same configuration as the related charge pump illustrated in FIG. 1B. Specifically, the charge pump 603 may have a first switch (M11) having one end that is connected to power voltage (AVDD) to control on/off in response to the first control signal (SW1), a first capacitor (C11: pumping cap) having one end that is connected to an other end of the first switch (M11), a second switch (M13) having one end that is connected to power voltage (AVDD) and an other end that is connected to the other end of the first capacitor (C11: pumping cap) to control on/off in response to the second control signal (SW3), a third switch (M12) having one end that is connected to the one end of the first capacitor (C11: pumping cap) and an other end that is connected to pumping voltage (AVDD*2 (VGH)) to control on/off in response to the third control signals (SW2), a second capacitor (C12: storaging cap) having one end that is connected to pumping voltage (AVDD*2 (VGH)) and an other end that is connected to ground voltage (VSS), and a fourth switch (M14) having one end that is connected to the other end of the first capacitor (C11: pumping cap) and an other end that is connected to ground voltage (VSS) to control on/off in response to the fourth control signal (SW4).

Figure 7:
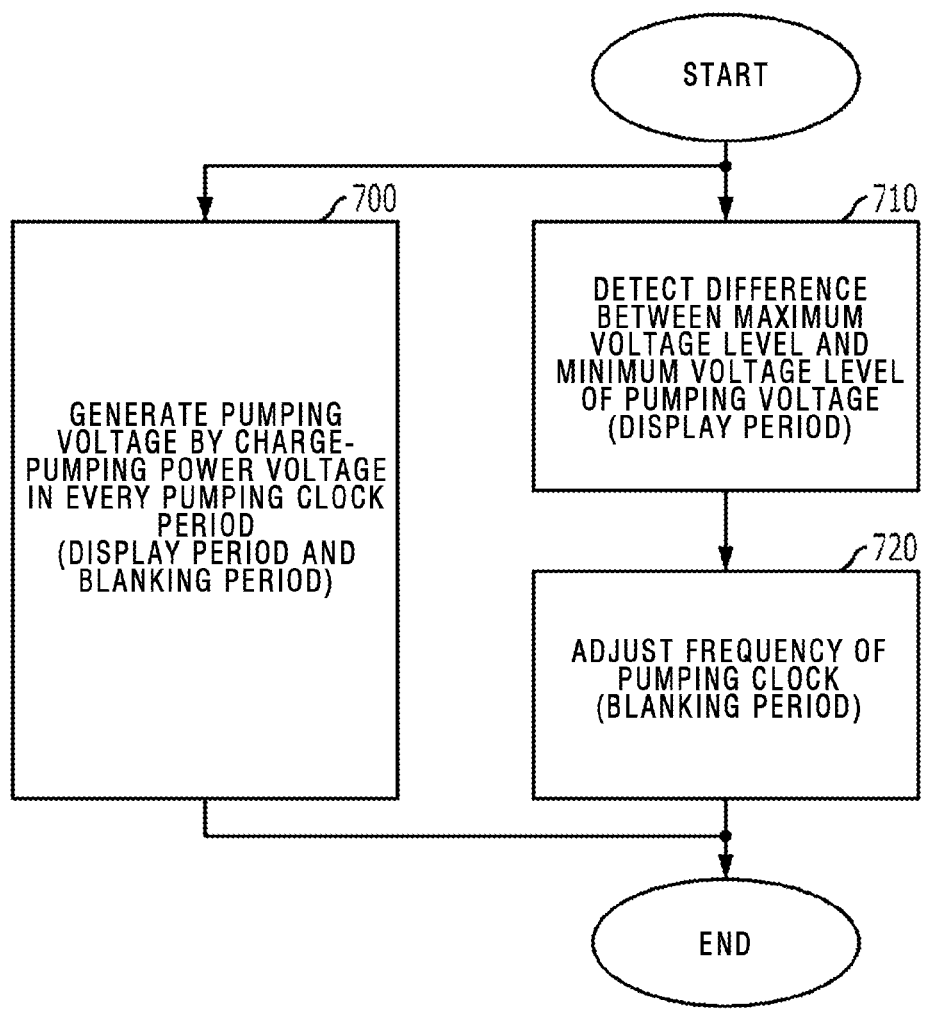
FIG. 7 is a flowchart illustrating an example of an operation mechanism of the charge pump circuit illustrated in FIG. 6.

FIG. 7 is a flowchart illustrating an example of an operation mechanism of the charge pump circuit illustrated in FIG. 6.

Referring to FIG. 7, an operation of the charge pump circuit illustrated in FIG. 6 may include generating pumping voltage (PUMPING_VOL) by charge-pumping power voltage (AVDD) at every period in a display period and a blanking period of a pumping clock (700), detecting a difference in a voltage level between a maximum voltage level and a minimum voltage level of the pumping voltage (PUMPING_VOL) in the display period (710), and adjusting a frequency of the pumping clock in response to the result of the detecting of the difference (710) in the blanking period (720).

In this case, the above-mentioned first display period and second display period may represent an operation section in which a liquid crystal operates in DDI (Display Driver IC, LCD/AMOLED Driver IC, and so on) and the above-mentioned blanking period may represent an operation section in which a liquid crystal does not operate.

In addition, the adjusting of the frequency (720) that is performed only in the blanking period may include, if the difference in the voltage level between the maximum voltage level and the minimum voltage level of the pumping voltage (PUMPING_VOL) determined through the detecting of the difference in the first display period (710) is less than a predetermined reference level difference, applying the frequency of the pumping clock slowly according to a predetermined unit, if the difference in the voltage level between the maximum voltage level and the minimum voltage level of the pumping voltage (PUMPING_VOL) determined through the detecting of the difference (710) is greater than the predetermined reference level difference, applying the frequency of the pumping clock (PUMPING CLOCK) fast according to the predetermined unit, and, if a difference in the voltage level between the maximum voltage level and the minimum voltage level of the pumping voltage (PUMPING_VOL) determined through the detecting of the difference (710) is consistent with the predetermined reference level difference within a predetermined scope, maintaining the frequency of the pumping clock as it is.

Accordingly, once a receipt of a pumping reference clock having a reference frequency set through the adjusting of the frequency (720) and adjusting the frequency of the pumping clock based on a ratio corresponding to a frequency control code (FRQ_CON_CODE) are completed, the frequency of the pumping clock may be maintained in the operation section of the display period even if the frequency control code (FRQ_CON_CODE) is changed.

In addition, the detecting of the difference (710) that is performed only in the display period may include determining a value of a maximum reference level control code (MAX_VOL_CODE<1:5>) corresponding to the maximum voltage level of the pumping voltage (PUMPING_VOL) and a value of a minimum level control code (MIN_VOL_CODE<1:5>) corresponding to the minimum voltage level of the pumping voltage (PUMPING_VOL), and generating a frequency control code (FRQ_CON_CODE) in response to the maximum reference level control code (MAX_VOL_CODE<1:5>) and the minimum reference level control code (MIN_VOL_CODE<1:5>).

Accordingly, the values of the maximum reference level control code (MAX_VOL_CODE<1:5>) and the minimum reference level control code (MIN_VOL_CODE<1:5>) determined in the operation section of the display period are not changed in the operation section of the blanking period.

In this case, the determining of the value of the maximum reference level control code (MAX_VOL_CODE<1:5>) may include comparing a voltage level of the pumping voltage (PUMPING_VOL) with a level of a maximum reference voltage (MAX_REF_VOL), the level of the maximum reference voltage being adjusted according to a predetermined unit depending on the value of the maximum reference level control code (MAX_VOL_CODE<1:5>) at every first expected section while a period of the pumping clock is repeated for a predetermined number of times.

Likewise, the determining of the value of the minimum reference level control code (MIN_VOL_CODE<1:5>) may include comparing a voltage level of the pumping voltage (PUMPING_VOL) with a level of a minimum reference voltage (MIN_REF_VOL), the level of the minimum reference voltage being adjusted according to a predetermined unit depending on the value of the minimum reference level control code (MIN_VOL_CODE<1:5>) at every second expected section while a period of the pumping clock is repeated for a predetermined number of times.

The above-mentioned examples may differ from each other in that a charge pump circuit according to the example illustrated in FIG. 2A may perform the adjusting of an operation frequency of a charge-pumping circuit according to a detection result of a maximum voltage level and a minimum voltage level of pumping voltage (PUMPING_VOL) and the adjusting of pumping driving power simultaneously. On the other hand, a charge pump circuit according to the example illustrated in FIG. 6 may perform the adjusting of an operation frequency of a charge-pumping circuit according to a detection result of a maximum voltage level and a minimum voltage level of pumping voltage (PUMPING_VOL).

That is, a charge pump circuit according to the example illustrated in FIG. 6 may not perform the adjusting of pumping driving power according to a result of detecting a voltage level of pumping voltage (PUMPING_VOL), while the adjusting of pumping driving power according to a result of detecting a voltage level of pumping voltage (PUMP-ING_VOL) may be performed by a charge pump circuit according to the example illustrated in FIG. 2A.

Compared with a semiconductor device having a charge pump circuit according to the example illustrated in FIG. 2A, a semiconductor device having a charge pump circuit according to the example illustrated in FIG. 6 may simplify a circuit and a controlling operation although it may not reduce consumption of electric current as much as a semiconductor device having a charge pump circuit according to the example illustrated in FIG. 2A. In addition, a charge pump circuit according to the example illustrated in FIG. 6 may reduce consumption of electric current significantly in comparison with the related charge pump circuit illustrated in FIGS. 1A and 1B.

Figure 8:
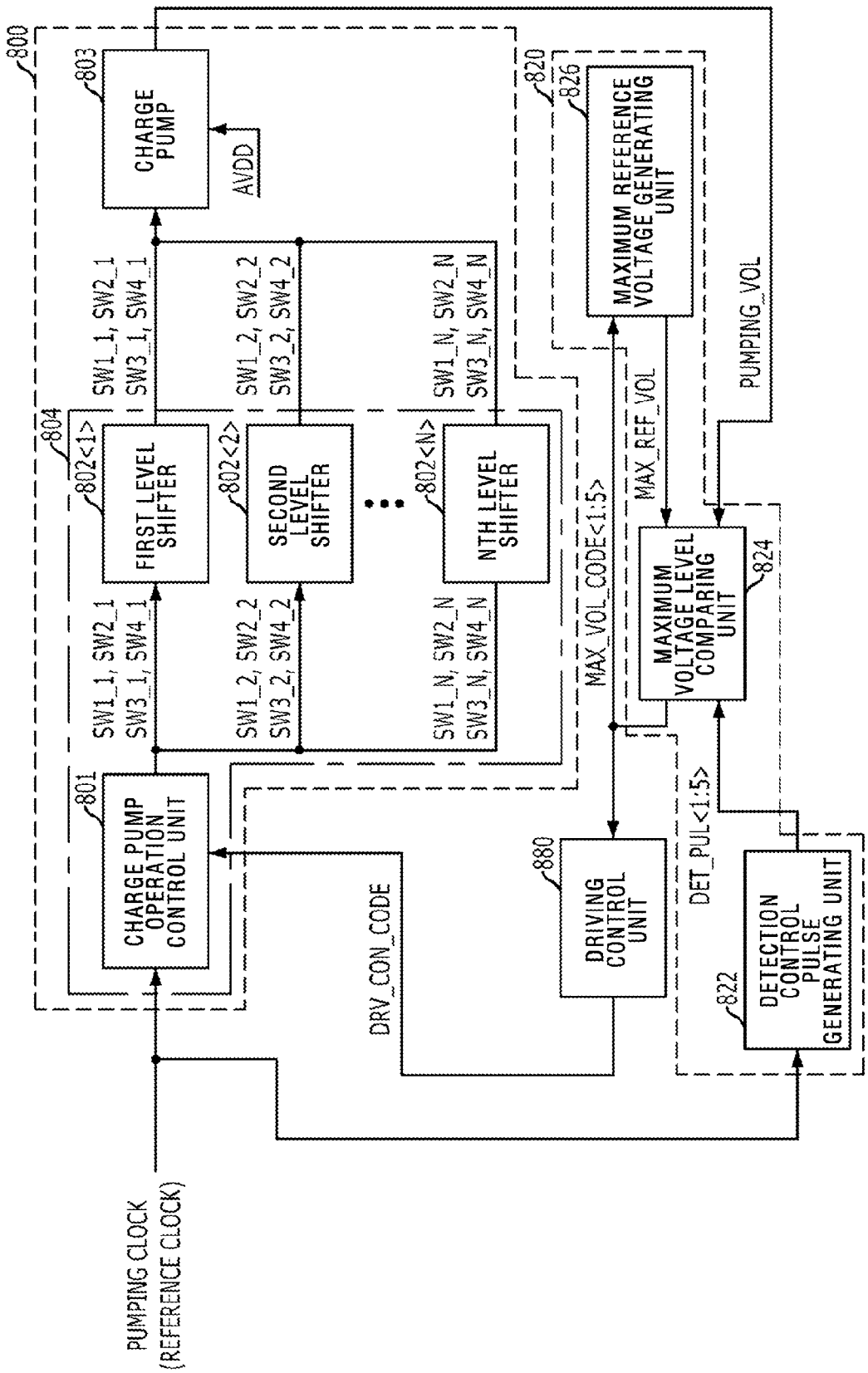
FIG. 8 is a block diagram illustrating still another example of a charge pump circuit.

FIG. 8 is a block diagram illustrating still another example of a charge pump circuit.

Referring to FIG. 8, a charge pump circuit according may include a charge-pumping unit 800 configured to charge-pump power voltage (AVDD) to generate pumping voltage (PUMPING_VOL), a voltage level detection unit 820 configured to detect a maximum voltage level of the generated pumping voltage (PUMPING_VOL), a driving control unit 880 configured to adjust charge-pumping driving power of the charge-pumping unit 800 in response to an output signal (MAX_VOL_CODE<1:5>) of the voltage level detection unit 820.

Herein, the voltage level detection unit 820 may include a detection control signal generating unit 822 configured to toggle a detection control pulse (DET_PUL1<1:5>) sequentially, the detection control pulse having a predetermined number that is set in an expected detection section at every predetermined number of period of a pumping clock, a maximum reference voltage generating unit 826 configured to generate maximum reference voltage (MAX_REF_VOL) having a level that is adjusted according to a predetermined unit in response to a maximum reference level control code (MAX_VOL_CODE<1:5>), and a maximum voltage level comparing unit 824 configured to compare a voltage level of the pumping voltage (PUMPING_VOL) with the level of the maximum reference voltage (MAX_REF_VOL) sequentially in response to toggling of the predetermined number of the detection control pulse (DET_PUL1<1:5>) respectively, and determine each bit value of the maximum reference level control code (MAX_VOL_CODE<1:5>) sequentially in response to the comparison result.

In addition, the charge-pumping unit 800 may include a pumping control unit 804 configured to respectively generate a plurality of first control signals (SW1<1:N>) and a plurality of fourth control signals (SW4<1:N>) in which a number of activated signals is determined in response to a driving control code (DRV_CON_CODE) in a pre-charge period of the pumping clock, and a plurality of second control signals (SW3<1:N>) and a plurality of third control signals (SW2<1:N>) in which a number of activated signals is determined in response to a driving control code (DRV_CON_CODE) in a pumping period of the pumping clock, and a charge pump 803 configured to perform a charge-pumping operation in response to the plurality of first to fourth control signals (SW1<1:N>, SW3<1:N>, SW2<1:N>, SW4<1:N>, respectively).

In addition, the charge pump 803 has the same configuration as the charge pump illustrated in FIG. 4. Therefore, referring to FIG. 4, the charge pump 803 may include a plurality of first switches (M11<1:N>) having one end connected to power voltage (AVDD) in parallel and on/off controlled in response to a plurality of first control signals (SW1<1:N>), a first capacitor (C11: pumping cap) having one end commonly connected to an other end of the plurality of first switches (M11<1:N>), a plurality of second switches (M13<1:N>) having one end connected to power voltage (AVDD) in parallel, an other end connected to the other end of the first capacitor (C11: pumping cap) in parallel, and on/off controlled in response to a plurality of second control signals (SW3<1:N>), a plurality of third switches (M12<1:N>) having one end connected to the one end of the first capacitor (C11: pumping cap) in parallel, an other end connected to pumping voltage (AVDD*2 (VGH)) in parallel, and on/off controlled in response to a plurality of third control signals (SW2<1:N>), a second capacitor (C12: storaging cap) having one end connected to the pumping voltage (AVDD*2 (VGH)) and an other end connected to ground voltage (VSS), and a plurality of fourth switches (M14<1:N>) having one end connected to the other end of the first capacitor (C11: pumping cap) in parallel, an other end connected to ground voltage (VSS) in parallel, and on/off controlled in response to a plurality of fourth control signals (SW4<1:N>).

In addition, the driving control unit may have two example configurations.

As illustrated in FIG. 8, a first example of a driving control unit 880 may be configured to perform a set operation of a value of the maximum reference level control code (MAX_VOL_CODE<1:5>) to determine a value of a driving control code (DRV_CON_CODE).

Although not illustrated, a second example of a driving control unit may be configured to select one of a plurality of driving control codes (DRV_CON_CODE<1> or DRV_CON_CODE<2> or . . . or DRV_CON_CODE<K>), the selected driving control code being configured to correspond to the maximum reference level control code (MAX_VOL_CODE<1:5>), the plurality of driving control codes (DRV_CON_CODE<1:K>) having values that are preset in accordance with a variable value of the maximum reference level control code (MAX_VOL_CODE<1:5>).

FIG. 9 is a flowchart of an example of an operation mechanism of the charge pump circuit illustrated in FIG. 8.

Referring to FIG. 9, an operation of the charge pump circuit illustrated in FIG. 8 may include generating pumping voltage (PUMPING_VOL) by charge-pumping power voltage (AVDD) at every period of the pumping clock in a display period and a blanking period (900), adjusting charge-pumping driving power in the blanking period in response to a driving control code (DRV_CON_CODE) (940), detecting a maximum voltage level of the pumping voltage (PUMPING_VOL) in the display period (930), and determining a value of the driving control code (DRV_CON_CODE) in response to the result of the detecting of the maximum voltage level (940).

In this case, the above-mentioned first display period and second display period may represent an operation section in which a liquid crystal operates in DDI (Display Driver IC, LCD/AMOLED Driver IC, and so on). Further, the above-mentioned blanking period may represent an operation section in which a liquid crystal does not operate.

In addition, the determining of the value of the driving control code (DRV_CON_CODE) may include, if the maximum voltage level of the pumping voltage (PUMPING_VOL) determined through the detecting of the maximum voltage level (930) is less than a predetermined reference level by greater than a predetermined scope, increasing the value of the driving control code (DRV_CON_CODE), if the maximum voltage level of the pumping voltage (PUMPING_VOL) determined through the detecting of the maximum voltage level (930) is greater than the predetermined reference level by greater than the predetermined scope, decreasing the value of the driving control code (DRV_CON_CODE), and, if the maximum voltage level of the pumping voltage (PUMPING_VOL) determined through the detecting of the maximum voltage level (930) is consistent with the predetermined reference level within the predetermined scope, maintaining the value of the driving control code (DRV_CON_CODE) as it is.

The adjusting of the charge-pumping driving power (940) may be performed only in an operation section of a blanking period, and may include, if the value of the driving control code (DRV_CON_CODE) increases, generating the pumping voltage (PUMPING_VOL) by charge-pumping power voltage (AVDD) with increased charge-pumping driving power, if the value of the driving control code (DRV_CON_CODE) decreases, generating the pumping voltage (PUMPING_VOL) by charge-pumping power voltage (AVDD) with decreased charge-pumping driving power, and, if the value of the driving control code (DRV_CON_CODE) is maintained, generating the pumping voltage (PUMPING_VOL) by charge-pumping power voltage (AVDD) with previous charge-pumping driving power.

Accordingly, even if a value of a driving control code (DRV_CON_CODE) is changed in an operation section of a display period, charge-pumping driving power of a charge pump circuit does not change and pumping voltage (PUMPING_VOL) is generated by charge-pumping power voltage (AVDD) with previous charge-pumping driving power.

For reference, if a power on period which is performed before an operation section of a display period and a blanking period is entered, a value of a driving control code (DRV_CON_CODE) is always fixed to a maximum value and, as a result, the pumping voltage (PUMPING_VOL) is generated by charge-pumping power voltage (AVDD) with maximum charge-pumping driving power.

The detecting of the voltage level (930) may be performed only in a display period and may include the determining of an each bit value of a maximum reference level control code (MAX_VOL_CODE<1:5>) sequentially by comparing a voltage level of the pumping voltage (PUMPING_VOL) in every expected detection section of each period with the level of the maximum reference voltage (MAX_REF_VOL), the level of the maximum reference voltage being adjusted according to a predetermined unit based on the value of the maximum reference level control code (MAX_VOL_CODE<1:5>), while a period of the pumping clock is repeated for a predetermined number of times.

Accordingly, the value of the maximum reference level control code (MAX_VOL_CODE<1:5>) determined in the operation section of the display period is maintained in an operation section of the blanking period without being changed.

The above-mentioned example may differ from the example illustrated in FIG. 2A in that a charge pump circuit according to the example illustrated in FIG. 2A may perform the adjusting of the operation frequency of the charge-pumping circuit according to the detection result of the maximum voltage level and the minimum voltage level of the pumping voltage (PUMPING_VOL) and the adjusting of the pumping driving power simultaneously. On the other hand, a charge pump circuit according to the example illustrated in FIG. 8 may perform only the adjusting of the pumping driving power according to a detection result of a maximum voltage level of the pumping voltage (PUMPING_VOL).

That is, a charge pump circuit according to the example illustrated in FIG. 8 may not perform an adjusting of an operation frequency of a charge pumping circuit according to a result of detecting a voltage level of pumping voltage (PUMPING_VOL), while the adjusting of the operation frequency of the charge-pumping circuit according to the detection result of the maximum voltage level and the minimum voltage level of the pumping voltage (PUMPING_VOL) may be performed by a charge pump circuit according to the example illustrated in FIG. 2A.

Compared with a semiconductor device having a charge pump circuit according to the example illustrated in FIG. 2A, a semiconductor device having a charge pump circuit according to the example illustrated in FIG. 8 may simplify a circuit and a controlling operation although it may not reduce consumption of electric current as much as a semiconductor device having a charge pump circuit according to the example illustrated in FIG. 2A. In addition, a charge pump circuit according to the example illustrated in FIG. 8 may reduce consumption of electric current significantly in comparison with the related charge pump circuit illustrated in FIGS. 1A and 1B.

A number of examples have been described above. Nevertheless, it will be understood that various modifications may be made. For example, suitable results may be achieved if the described techniques are performed in a different order and/or if components in a described system, architecture, device, or circuit, are combined in a different manner and/or replaced or supplemented by other components and their equivalents. Accordingly, other implementations are within the scope of the following claims.

What is claimed is:

1. A semiconductor device, comprising:
   a charge-pumping unit configured to charge-pump power voltage in every period of a pumping clock to generate pumping voltage;
   a first voltage level detection unit configured to receive the generated pumping voltage and detect a maximum voltage level of the received pumping voltage;
   a second voltage level detection unit configured to receive the generated pumping voltage and detect a minimum voltage level of the received pumping voltage; and
   a pumping clock generating unit configured to generate the pumping clock, the pumping clock having a frequency that is adjusted in response to an output signal of the first and the second voltage level detection units,
   wherein the maximum voltage level is detected in response to a pumping period ending and the minimum voltage level is detected in response to a pre-charge period ending.

2. The semiconductor device as claimed in claim 1, further comprising:
   a driving control unit configured to control charge-pumping driving power of the charge-pumping unit in response to the output signal of the first voltage level detection unit.

3. The semiconductor device as claimed in claim 2, wherein the first voltage level detection unit comprises a first detection control pulse generating unit, a maximum reference voltage generating unit, and a maximum voltage level comparing unit, the first detection control pulse generating unit being configured to toggle a first detection control pulse sequentially and comprising a predetermined number that is set in an expected first detection section at every predetermined number of period of the pumping clock, the maximum reference voltage generating unit being configured to generate a maximum reference voltage and comprising a level that is adjusted according to a predetermined unit in response to a maximum reference level control code, the maximum voltage level comparing unit being configured to compare a voltage level of the received pumping voltage with the level of the maximum reference voltage sequentially in response to the toggling of the predetermined number of the first detection control pulse, respectively, the maximum voltage level comparing unit being further configured to determine each bit value of the maximum reference level control code sequentially in response to a result of the comparing of the voltage level of the received pumping voltage with the level of the maximum reference voltage.

4. The semiconductor device as claimed in claim 3, wherein the second voltage level detection unit comprises a second detection control pulse generating unit, a minimum reference voltage generating unit, and a minimum voltage level comparing unit, the second detection control pulse generating unit being configured to toggle a second detection control pulse sequentially and comprising a predetermined number that is set in an expected second detection section at every predetermined number of period of the pumping clock, the minimum reference voltage generating unit being configured to generate a minimum reference voltage, the minimum reference voltage comprising a level that is adjusted according to a predetermined unit in response to a minimum reference level control code, the minimum voltage level comparing unit being configured to compare the voltage level of the received pumping voltage with the level of the minimum reference voltage sequentially in response to the toggling of the predetermined number of the second detection control pulse, respectively, the minimum voltage level comparing unit being further configured to determine each bit value of the minimum reference level control code sequentially in response to a result of the comparing of the voltage level of the received pumping voltage with the level of the minimum reference voltage.

5. The semiconductor device as claimed in claim 4, wherein the charge-pumping unit comprises a pumping control unit and a charge pump, the pumping control unit being configured to respectively generate a plurality of first control signals and a plurality of fourth control signals in which a number of activated signals is determined in response to a driving control code in a pre-charge period of the pumping clock and a plurality of second control signals and a plurality of third control signals in which a number of activated signals is determined in response to a driving control code in a pumping period of the pumping clock, the charge pump being configured to perform a charge-pumping operation in response to the plurality of first to fourth control signals.

6. The semiconductor device as claimed in claim 5, wherein the charge pump comprises a plurality of first switches, a first capacitor, a plurality of second switches, a plurality of third switches, a second capacitor, and a plurality of fourth switches, the plurality of first switches comprising one end connected to power voltage in parallel and on/off controlled in response to the plurality of first control signals, respectively, the first capacitor comprising one end commonly connected to an other end of the plurality of first switches, the plurality of second switches comprising one end connected to the power voltage in parallel, and another end connected to an other end of the first capacitor in parallel, and on/off controlled in response to the plurality of second control signals, the plurality of third switches comprising one end connected to the one end of the first capacitor in parallel, and another end connected to pumping voltage in parallel, and on/off controlled in response to the plurality of third control signals, the second capacitor comprising one end connected to the pumping voltage and another end connected to ground voltage, the plurality of fourth switches comprising one end connected to the other end of the first capacitor in parallel, and another end connected to ground voltage in parallel, and on/off controlled in response to the plurality of fourth control signals.

7. The semiconductor device as claimed in claim 5, wherein the driving control unit is further configured to perform a set operation of a value of the maximum reference level control code to determine a value of the driving control code.

8. The semiconductor device as claimed in claim 5, wherein the driving control unit is further configured to select one of a plurality of driving control codes, the selected driving control code being configured to correspond to the maximum reference level control code, the plurality of driving control codes having values that are preset in accordance with a variable value of the maximum reference level control code.

9. The semiconductor device as claimed in claim 4, wherein the pumping clock generating unit comprises a code operation unit and a pumping clock output unit, the code operation unit being configured to perform an operation set between a value of the maximum reference level control code and a value of the minimum reference level control code to generate a frequency control code, the pumping clock output unit being configured to receive a pumping reference clock comprising a predetermined reference frequency to output the pumping clock of which frequency is changed based on a ratio corresponding to the frequency control code.

10. The semiconductor device as claimed in claim 4, wherein the pumping clock generating unit comprises a frequency control code table and a pumping clock output unit, the frequency control code table being configured to select one of plurality of frequency control codes, the selected frequency control code being configured to correspond to the maximum and minimum reference level control codes, the plurality of frequency control codes comprising values that are preset in accordance with a variable value of the maximum and minimum reference level control codes, the pumping clock output unit being configured to receive a pumping reference clock having a predetermined reference frequency to output the pumping clock of which frequency is changed according to a ratio corresponding to the selected frequency control code.

11. A semiconductor device, comprising:
a charge-pumping unit configured to charge-pump power voltage with charge-pumping driving power corresponding to a driving control code in repeated display periods and blanking periods to generate pumping voltage;
a voltage level detection unit configured to receive the generated pumping voltage and detect a maximum voltage level of the received pumping voltage in the display periods; and
a driving control unit configured to determine a value of the driving control code in the blanking periods to control the charge-pumping driving power of the charge-pumping unit, in response to an output signal of the voltage level detection unit,
wherein the maximum voltage level is detected in response to a pumping period ending.

12. The semiconductor device as claimed in claim 11, wherein the voltage level detection unit comprises a detection control pulse generating unit, a maximum reference voltage generating unit, and a maximum voltage level comparing unit, the detection control pulse generating unit being configured to toggle a detection control pulse sequentially, the detection control pulse comprising a predetermined number that is set in an expected detection section at every predetermined number of period of a pumping clock, the maximum reference voltage generating unit being configured to generate maximum reference voltage comprising a level is adjusted in response to a maximum reference level control code, the maximum voltage level comparing unit being configured to compare a voltage level of the received pumping voltage with the level of the maximum reference voltage sequentially in response to the toggling of the predetermined number of the detection control pulse, respectively, the maximum voltage level comparing unit being further configured to determine each bit value of the maximum reference level control code sequentially in response to a result of the comparing of the voltage level of the received pumping voltage with the level of the maximum reference voltage.

13. The semiconductor device as claimed in claim 12, wherein the charge-pumping unit comprises a pumping control unit and a charge pump, the pumping control unit being configured to respectively generate a plurality of first control signals and a plurality of fourth control signals in which a number of activated signals is determined in response to the driving control code in a pre-charge period of the pumping clock and a plurality of second control signals and a plurality of third control signals in which a number of activated signals is determined in response to the driving control code in a pumping period of the pumping clock, the charge pump being configured to perform a charge-pumping operation in response to the plurality of first to fourth control signals.

14. The semiconductor device as claimed in claim 13, wherein the charge pump comprises a plurality of first switches, a first capacitor, a plurality of second switches, a plurality of third switches, a second capacitor, and a plurality of fourth switches, the plurality of first switches comprising one end connected to power voltage in parallel and on/off controlled in response to the plurality of first control signals, respectively, the first capacitor comprising one end commonly connected to an other end of the plurality of first switches, the plurality of second switches comprising one end connected to the power voltage in parallel, and another end connected to an other end of the first capacitor in parallel, and on/off controlled in response to the plurality of second control signals, the plurality of third switches having one end connected to the one end of the first capacitor in parallel, and another end connected to pumping voltage in parallel, and on/off controlled in response to the plurality of third control signals, the second capacitor comprising one end connected to the pumping voltage and another end connected to ground voltage, the plurality of fourth switches comprising one end connected to the other end of the first capacitor in parallel, and another end connected to ground voltage in parallel, and on/off controlled in response to the plurality of fourth control signals.

15. The semiconductor device as claimed in claim 13, wherein the driving control unit is further configured to perform a set operation of a value of the maximum reference level control code to determine the value of the driving control code.

16. The semiconductor device as claimed in claim 13, wherein the driving control unit is further configured to select one of a plurality of driving control codes, the selected driving control code being configured to correspond to the maximum reference level control code, the plurality of driving control codes having values that are preset in accordance with a variable value of the maximum reference level control code.

17. A method for operating a semiconductor device in which pumping voltage is generated by performing charge-pumping with pumping driving power corresponding to a driving control code in every period of a pumping clock where a first display period, a first blanking period, a second display period, and a second blanking period are repeated sequentially, the method comprising:

receiving the generated pumping voltage;

detecting a difference of a maximum voltage level and a minimum voltage level of the received pumping voltage in the first display period;

detecting a maximum voltage level of the received pumping voltage in the second display period;

adjusting a frequency of the pumping clock in the first blanking period in response to the detecting of the difference; and determining a value of the driving control code in the second blanking period in response to a result of the detecting of the maximum voltage level, wherein the maximum voltage level is detected in response to a pumping period ending and the minimum voltage level is detected in response to a pre-charge period ending.

18. The method as claimed in claim 17, wherein the adjusting of the frequency comprises applying the frequency of the pumping clock slowly according to a predetermined unit in the first blanking period if the detected difference is less than a predetermined reference level difference, applying the frequency of the pumping clock fast according to the predetermined unit in the first blanking period if the detected difference is greater than the predetermined reference level difference, and maintaining the frequency of the pumping clock if the detected difference is consistent with the predetermined reference level difference within a predetermined scope.

19. The method as claimed in claim 17, wherein the detection of the difference comprises determining a value of a maximum reference level control code corresponding to the maximum voltage level in an operation section of the first display period, determining a value of a minimum reference level control code corresponding to the minimum voltage level in the operation section of the first display period, and generating a frequency control code in response to the maximum reference level control code and the minimum reference level control code in the operation section of the first display period.

20. The method as claimed in claim 19, wherein the determining of the values of the maximum and minimum reference level control codes comprises determining an each bit value of the maximum reference level control code sequentially by comparing a voltage level of the received pumping voltage in every expected section of the detecting of the difference of each period with a level of a maximum reference voltage, the level of the maximum reference voltage being adjusted according to a predetermined unit based on the value of the maximum reference level control code, a period of the pumping clock being repeated for a predetermined number of times in the operation section of the first display period, determining an each bit value of the minimum reference level control code sequentially by comparing a voltage level of the received pumping voltage in every expected section of the detecting of the maximum voltage level of each period with a level of a minimum reference voltage, the level of the minimum reference voltage being adjusted according to a predetermined unit based on the value of the minimum reference level control code, a period of the pumping clock being repeated for a predetermined number of times in the operation section of the first display period, and maintaining the values of the maximum and minimum reference level control codes that are determined in the operation section of the first display period in an operation section of the first blanking period.

21. The method as claimed in claim 19, wherein the generating of the frequency control code comprises performing an operation set between the value of the maximum reference level control code and the value of the minimum reference level control code to generate the frequency control code, and selecting the frequency control code corresponding to the maximum and minimum reference level control codes from among a plurality of frequency control codes of which values are preset in accordance with a variable value of the maximum and minimum reference level control codes.

22. The method as claimed in claim 19, wherein the adjusting of the frequency comprises receiving a pumping reference clock having a reference frequency set in an operation section of the first blanking period, adjusting a frequency of the pumping clock based on a ratio corresponding to the frequency control code, and maintaining the adjusted frequency of the pumping clock in the first blanking period regardless of a change in the frequency control code in the operation section of the first display period.

23. The method as claimed in claim 17, wherein the determining of the value of the driving control code comprises increasing the value of the driving control code if the detected maximum voltage level is less than a predetermined reference level by greater than a predetermined scope, decreasing the value of the driving control code if the detected maximum voltage level is greater than the predetermined reference level by greater than the predetermined scope, and maintaining the value of the driving control code if the detected maximum voltage level is consistent with the predetermined reference level within the predetermined scope.

24. The method as claimed in claim 23, further comprising:

if the value of the driving control code increases in an operation section of the second blanking period, generating the pumping voltage by charge-pumping power voltage with increased charge-pumping driving power;

if the value of the driving control code decreases in the operation section of the second blanking period, generating the pumping voltage by charge-pumping power voltage with decreased charge-pumping driving power;

if the value of the driving control code is maintained in the operation section of the second blanking period, generating the pumping voltage by charge-pumping power voltage with previous charge-pumping driving power; and if the value of the driving control code is changed in an operation section of the first and the second display periods, generating the pumping voltage by charge-pumping power voltage with previous charge-pumping driving power.

25. The method as claimed in claim 23, wherein, in a power on period that is performed before an operation section of the first and the second display periods and the first and the second blanking periods, the value of the driving control code is always fixed to a maximum value regardless of the determining of the value, and the pumping voltage is generated by charge-pumping power voltage with maximum charge-pumping driving power accordingly.

26. The method as claimed in claim 17, wherein the detecting of the maximum voltage level comprises determining an each bit value of a maximum reference level control code sequentially by comparing a voltage level of the received pumping voltage in every expected section of the detected difference and maximum voltage level of each period with a level of a maximum reference voltage, the level of the maximum reference voltage being adjusted according to a predetermined unit based on a value of a maximum reference level control code, a period of the pumping clock being repeated for a predetermined number of times in an operation section of the second display period, and maintaining the value of the maximum reference level control code in an operation section of the second blanking period, the value of the maximum reference level control code being determined in the operation section of the second display period.

27. The method as claimed in claim 26, wherein the determining of the value of the driving control code comprises generating the driving control code by performing a set operation of the value of the maximum reference level control code, and selecting the driving control code corresponding to the maximum reference level control code from among a plurality of driving control codes having values that are preset in accordance with a variable value of the maximum reference level control code.

28. A method for operating a semiconductor device in which pumping voltage is generated by charge-pumping power voltage with pumping driving power corresponding to a driving control code in repeated display periods and blanking periods, the method comprising:
receiving the generated pumping voltage;
detecting a maximum voltage level of the received pumping voltage in the display periods; and
determining a value of the driving control code in the blanking periods in response to the detected maximum voltage level,
wherein the maximum voltage level is detected in response to a pumping period ending.

29. The method as claimed in claim 28, wherein the determining of the value comprises increasing the value of the driving control code if the detected maximum voltage level is less than a predetermined reference level by greater than a predetermined scope, decreasing the value of the driving control code if the detected maximum voltage level is greater than the predetermined reference level by greater than the predetermined scope, and maintaining the value of the driving control code if the detected maximum voltage level is consistent with the predetermined reference level within the predetermined scope.

30. The method as claimed in claim 29, further comprising:
if the value of the driving control code increases in an operation section of the blanking periods, generating the pumping voltage by charge-pumping power voltage with increased charge-pumping driving power;
if the value of the driving control code decreases in the operation section of the blanking periods, generating the pumping voltage by charge-pumping power voltage with decreased charge-pumping driving power;
if the value of the driving control code is maintained in the operation section of the blanking period, generating the pumping voltage by charge-pumping power voltage with previous charge-pumping driving power; and
if the value of the driving control code is changed in an operation section of the display periods, generating the pumping voltage by charge-pumping power voltage with previous charge-pumping driving power.

31. The method as claimed in claim 29, wherein, in a power on period that is entered as power is supplied and is performed before the display and blanking periods, the value of the driving control code is always fixed to a maximum value regardless of the determining of the value, and the pumping voltage is generated by charge-pumping power voltage with maximum charge-pumping driving power accordingly.

32. The method as claimed in claim 28, wherein the detecting of the maximum voltage level comprises determining an each bit value of a maximum reference level control code sequentially by comparing a voltage level of the received pumping voltage in every expected section of the detecting of the maximum voltage level of each period with a level of a maximum reference voltage, the level of the maximum reference voltage being adjusted according to a predetermined unit based on the value of a maximum reference level control code, a period of the pumping clock being repeated for a predetermined number of times in an operation section of the display periods, and maintaining the value of the maximum reference level control code in an operation section of the blanking periods.

33. The method as claimed in claim 32, wherein the determining of the value comprises generating the driving control code by performing a set operation of the value of the maximum reference level control code, and selecting the driving control code corresponding to the maximum reference level control code from among a plurality of driving control codes having values that are preset in accordance with a variable value of the maximum reference level control code.

34. A method for operating a semiconductor device in which pumping voltage is generated by charge-pumping power voltage with pumping driving power corresponding to a driving control code in repeated display periods and blanking periods, the method comprising:
receiving the generated pumping voltage;
detecting a maximum voltage level and a minimum voltage level of the received pumping voltage in the display periods;
adjusting a frequency of the pumping clock in the blanking periods in response to a difference between the detected maximum voltage level and the detected minimum voltage level; and
determining a value of the driving control code in the blanking periods in response to the detected maximum voltage level,
wherein the maximum voltage level is detected in response to a pumping period ending and the minimum voltage level is detected in response to a pre-charge period ending.

35. The method as claimed in claim 34, wherein the adjusting of the frequency comprises applying the frequency of the pumping clock slowly as much as a predetermined unit in the blanking periods if a difference in a voltage level between the detected maximum voltage level and the detected minimum voltage level is less than a predetermined reference level difference, applying the frequency of the pumping clock fast as much as the predetermined unit in the blanking periods if the difference in the voltage level between the detected maximum voltage level and the detected minimum voltage level is greater than the predetermined reference level difference, and maintaining the frequency of the pumping clock in the blanking periods if the difference in the voltage level between the detected maximum voltage level and the detected minimum voltage level is consistent with the predetermined reference level difference within in a predetermined scope.

36. The method as claimed in claim 34, wherein the determining of the value comprises increasing the value of the driving control code if the detected maximum voltage level is less than a predetermined reference level by greater than a predetermined scope, decreasing the value of the driving control code if the detected maximum voltage level is greater than the predetermined reference level by greater than the predetermined scope, and maintaining the value of the driving control code if the detected maximum voltage level is consistent with the predetermined reference level within the predetermined scope.

37. The method as claimed in claim 34, wherein the detecting comprises, in an operation section of the display periods, determining a value of a maximum reference level control code corresponding to the detected maximum voltage level, and determining a value of a minimum reference level control code corresponding to the detected minimum voltage level.

38. The method as claimed in claim 37, wherein the adjusting of the frequency comprises generating a frequency control code by performing an operation set between the value of the maximum reference level control code and the value of the minimum reference level control code, selecting the frequency control code corresponding to the maximum and minimum reference level control codes from among a plurality of frequency control codes having values that are preset in accordance with a variable value of the maximum and minimum reference level control codes, receiving a pumping reference clock having a reference frequency set in an operation section of the blanking periods, adjusting a frequency of the pumping clock based on a ratio corresponding to the frequency control code, and maintaining the adjusted frequency of the pumping clock in the blanking periods regardless of a change in the frequency control code in an operation section of the display periods.

39. The method as claimed in claim 37, wherein the determining of the value of the driving control code comprises generating the driving control code by performing a set operation of the determined value of the maximum reference level control code, and selecting the driving control code corresponding to the maximum reference level control code from among a plurality of driving control codes that are preset in accordance with a variable value of the maximum reference level control code.

* * * * *